US011608295B2

(12) United States Patent
Matsumoto et al.

(10) Patent No.: US 11,608,295 B2
(45) Date of Patent: Mar. 21, 2023

(54) DISPERSANT COMPOSITION

(71) Applicant: Construction Research & Technology GmbH, Trostberg (DE)

(72) Inventors: Toshimi Matsumoto, Chigasaki (JP); Viswanath Mahadevan, Singapore (SG); Fang Hua Lei, Shanghai (CN)

(73) Assignee: Construction Research & Technology, GmbH, Trostberg (DE)

( * ) Notice: Subject to any disclaimer, the term of this patent is extended or adjusted under 35 U.S.C. 154(b) by 369 days.

(21) Appl. No.: 16/770,605

(22) PCT Filed: Dec. 5, 2018

(86) PCT No.: PCT/EP2018/083583

§ 371 (c)(1),
(2) Date: Jun. 7, 2020

(87) PCT Pub. No.: WO2019/110634

PCT Pub. Date: Jun. 13, 2019

(65) Prior Publication Data

US 2021/0163356 A1 Jun. 3, 2021

(30) Foreign Application Priority Data

Dec. 7, 2017 (WO) ................ PCT/CN2017/115036

(51) Int. Cl.

| | |
|---|---|
| ***C04B 24/26*** | (2006.01) |
| ***C04B 24/24*** | (2006.01) |
| ***C04B 24/32*** | (2006.01) |
| ***C04B 40/00*** | (2006.01) |
| *C04B 103/00* | (2006.01) |
| *C04B 103/40* | (2006.01) |
| *C04B 103/50* | (2006.01) |

(52) U.S. Cl.

CPC ........ *C04B 24/2647* (2013.01); *C04B 24/246* (2013.01); *C04B 24/32* (2013.01); *C04B 40/0039* (2013.01); *C04B 2103/0061* (2013.01); *C04B 2103/408* (2013.01); *C04B 2103/50* (2013.01)

(58) Field of Classification Search

CPC .............. C04B 24/2647; C04B 24/246; C04B 24/32; C04B 40/0039; C04B 2103/0061; C04B 2103/408; C04B 2103/50

See application file for complete search history.

(56) References Cited

U.S. PATENT DOCUMENTS

| | | | |
|---|---|---|---|
| 10,322,986 | B2 | 6/2019 | Tanaka et al. |
| 2013/0005861 | A1 | 1/2013 | Dierschke et al. |
| 2018/0086669 | A1 | 3/2018 | Tanaka et al. |

FOREIGN PATENT DOCUMENTS

| | | | |
|---|---|---|---|
| EP | 3279170 A1 | 2/2018 | |
| JP | S623060 A | 1/1987 | |
| JP | H04119955 A | 4/1992 | |
| WO | 2016158921 A1 | 6/2016 | |

OTHER PUBLICATIONS

International Search Report for application No. PCT/EP2018/083583, dated Feb. 27, 2019, 3 pages.
International Written Opinion for application No. PCT/EP2018/083583, dated Feb. 27, 2019, 6 pages.

*Primary Examiner* — John E Uselding
(74) *Attorney, Agent, or Firm* — Curatolo Sidoti & Trillis Co., LPA; Salvatore A. Sidoti; Floyd Trillis, III

(57) ABSTRACT

A dispersant composition includes a) at least one polymer constituted of monomers having naphthalene ring and/or melamine; b). at least one polymer having carboxylic acid and/or phosphoric acid group and/or any group that is hydrolyzed into carboxylic or phosphoric; and c). at least one polymer having a structure of Formula I:

Formula I

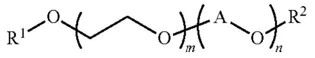

$R^1$ is hydrogen or alky group having carbon number not less than 1, cycloalkyl or cycloalkenyl group having carbon number not less than 3, alkenyl group having carbon number not less than 2, aryl group having carbon number not less than 6; $R^2$ is hydrogen or alky group having carbon number from 1 to 3; A is alkylene group having carbon number from 3 or 4; m and n are positive numbers wherein m is more than n and the sum of m and n is more than 9 and less than 12. Also provided is a method of using the dispersant composition in a mortar or concrete, and the weight percentage of the dispersant composition is from 0.01% to 2.5% based on the weight of cement in mortar. Further provided is an aqueous composition including the dispersant composition.

23 Claims, No Drawings

DISPERSANT COMPOSITION

CROSS REFERENCE TO RELATED APPLICATIONS

This application is a national stage application of International Application No. PCT/EP2018/083583, filed 5 Dec. 2018, which claims priority from International Application No. PCT/CN2017/115036, filed 7 Dec. 2017, both of which applications are incorporated herein by reference in their entireties.

TECHNICAL FIELD

This invention relates to a dispersant composition, more specifically, relates to a dispersant composition for cement, mortar or concrete.

BACKGROUND ART

Superplasticizers, also known as water reducers, are used as dispersants to avoid particle segregation and to improve the flow characteristics of suspensions such as in concrete applications. Superplasticizers are added to concrete or mortar to reduce the water to cement ratio with no affecting the workability of the mixture. The strength of concrete increases when the water to cement ratio decrease. One important class of superplasticizers is polycarboxylate ether-based superplasticizers (PCEs) which enables good particle dispersion due to their chemical structures i.e. methacrylic acid copolymers as the main chains and methoxy-polyethylene glycol copolymer as the side chains. A low dosage of PCEs leads to a dramatic water reduction. Another important class of superplasticizers are naphthalene sulfonate formaldehyde condensate (BNS) of which the main varieties are beta-naphthalene sulfonate formaldehyde condensate. BNS shows stable performance in various suspensions and working temperatures of enabling a good flowability of the suspensions. Moreover, BNS holds obvious advantages when applied in clay-bearing aggregates. It seems promising to combine PCEs and BNS to reach both advantages of them, however, the mixture of PCEs and BNS leads to a severe thickening of the mixture and the dispersant composition rapidly loose the function of dispersion. Therefore, the most common practice is to store PCEs and BNS separately and use them in different steps.

WO2016158921A1 disclosed a dispersant composition for a hydraulic composition comprising (A) a high-molecular compound having monomer units including a naphthalene ring; (B) a polymer having a weight-average molecular weight of 1,000 to 1,000,000 and having monomer units having an alkyleneoxy group and monomer units having a group selected from a carboxylic acid group, a phosphoric acid group, a group which changes to a carboxylic acid group by hydrolysis, and a group which changes to a phosphoric acid group by hydrolysis; and (C) a specific compound represented by general formulas (C1) through (C4).

Formula (C1)

$$R^{11}-X-(AO)_{n1}-SO_3M$$

Formula (C2)

$$R^{21}-X-(AO)_{n2}-R^{22}$$

-continued

Formula (C3)

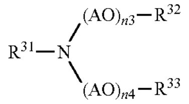

Formula (C4)

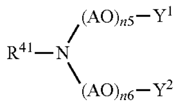

$R^{11}$ is a hydrocarbon group that $R^{11}$—H has an HLB of 5.10 or less; $R^{21}$ is a hydrocarbon group that $R^{21}$—H has an HLB of 5.10 or less; $R^{31}$ is a hydrocarbon group that $R^{31}$. H has an HLB of 5.10 or less; $R^{41}$ is a hydrocarbon group that $R^{41}$—H has an HLB of 5.10 or less; $R^{22}$, $R^{32}$, $R^{33}$ are independent with each other selected from hydrogen or hydrocarbon group having C1 to C3; $Y^1$ and $Y^2$ are independently with each other selected from hydrogen group or —$SO_3M$ and at least one of $Y^1$ and $Y^2$ is —$SO_3M$; M is a counter ion; AO is alkyleneoxy group having C2 to C4; X is —O— or —C(O)O—; n1 is an integer number from 0 to 300; n2 is an integer number from 1 to 300; n3 and n4 are integer number no less than 0 and the sum of n3 and n4 is from 1 to 300; n5 and n6 are integer number no less than 0 and the sum of n3 and n4 is from 1 to 300; $Y^1$ is a hydrogen group when n5 is 0; $Y^2$ is a hydrogen group when n6 is 0.

WO2016158921A1 provides a possible solution to the problem that PCEs and BNS are not able to be used simultaneously as superplasticizers, however, in WO2016158921A1 the huge number of the possible Components (C) leads to a latent problem i.e. the dramatic fluctuation in flowability of mortar and in its examples such fluctuation is verified. Moreover, for most examples, only the performance of flowability is tested but the performance compressive strength is not, which leave a potential problem that those Components (C) that improve the flowability of mortar might have negative influence on the compressive strength of mortar. Therefore, it is still not so clear for the skilled persons in the art what types of Components (C) enable to bring good effects to mortar or concrete in all required aspects including flowability and compressive strength.

SUMMARY OF INVENTION

One object of this invention is to provide a dispersant composition comprising: a). at least one polymer constituted of monomers having naphthalene ring and/or melamine; b). at least one polymer having carboxylic acid and/or phosphoric acid group and/or any group that is hydrolyzed into carboxylic or phosphoric; and c). at least one polymer having a structure of Formula I:

Formula I

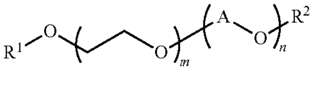

$R^1$ is hydrogen or alkyl group having carbon number not less than 1, cycloalkyl or cycloalkenyl group having carbon number not less than 3, alkenyl group having carbon number not less than 2, aryl group having carbon number not less than 6; $R^2$ is hydrogen or alkyl group having carbon number from 1 to 3; A is alkylene group having carbon number from 3 or 4; m and n are integer numbers wherein m is more than n and the sum of m and n is more than 9 and less than 12.

Another object of this invention is to provide a use of the dispersant composition in a mortar or concrete, and the weight percentage of the dispersant composition is from 0.01% to 2.5% based on the weight of cement in mortar.

Another object of this invention is to provide an aqueous composition comprising the dispersant composition.

DETAILED DESCRIPTION OF INVENTION

Technical Problem

Different surfactants are added to solve the problem that the dispersant admixtures of Polycarboxylate ether-based superplasticizers (PCEs) and naphthalene sulfonate formaldehyde condensate (BNS) get thickening and finally loose dispersibility in the cement, mortar or concrete. However, many surfactants tend to obviously decrease the compressive strength of the obtained concrete. Since compressive strength is one of the critical mechanical properties of concrete, it is significant to find surfactants that improve the compatibility of PCEs and BNS and increase the compressive strength of the concrete simultaneously.

Technical Solution

To solve the technical problem, it is provided a dispersant composition comprising a) at least one polymer constituted of monomers having naphthalene ring and/or melamine;

b). at least one polymer having carboxylic acid and/or phosphoric acid group and/or any group that is hydrolyzed into carboxylic or phosphoric; and c). at least one polymer having a structure of Formula I:

Formula I

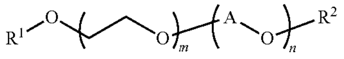

$R^1$ is hydrogen or alkyl group having carbon number not less than 1, cycloalkyl or cycloalkenyl group having carbon number not less than 3, alkenyl group having carbon number not less than 2, aryl group having carbon number not less than 6; $R^2$ is hydrogen or alkyl group having carbon number from 1 to 3; A is alkylene group having carbon number from 3 or 4; m and n are integer numbers wherein m is more than n and the sum of m and n is more than 9 and less than 12.

Component a) is naphthalene-based and/or melamine-based dispersant and Component b) is polycarboxylic ether-based and/or phosphoric acid-contained dispersant. When a naphthalene and/or melamine type dispersant and a polycarboxylic and/or phosphoric type dispersant are mixed, the viscosity of the mixture increases quickly and the dispersion performance turns to worse. The reason behind is the naphthalene ring of naphthalene-based dispersant and/or the melamine ring of melamine-based dispersant interacts with the polyalkyleneoxy group of polycarboxylic ether-based dispersant to form the coagulations that have an apparent high molecular weight. Such coagulations decrease the contact surface of dispersant with cement and therefore the dispersion performance gets worse. Component c) is prone to interact with the naphthalene ring of naphthalene-based dispersant and/or melamine ring of melamine-based dispersant and therefore eliminate the interaction of Component a) and Component b). The unentangled Component a) and Component b) absorbs to the surface of cement particles in different forms and therefore the synergistic effects of Component a) and Component b) are fulfilled in the concrete.

Preferably, Component a) is a condensate polymer obtained from the condensation of formaldehyde with the structure of Formula II-(a) and/or Formula II-(b):

Formula II-(a)

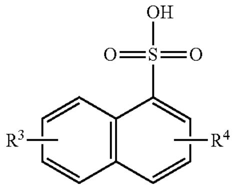

Formula II-(b)

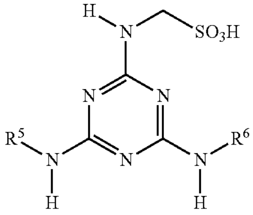

$R^3$, $R^4$ are independently from each other selected from hydrogen, methyl, ethyl, propyl, butyl and hydroxyl group; $R^5$, $R^6$ are independently from each other selected from hydrogen, methyl and ethyl group.

More preferably, Component a) is a condensate polymer obtained from the condensation of formaldehyde with the structure of Formula II-(a):

Formula II-(a)

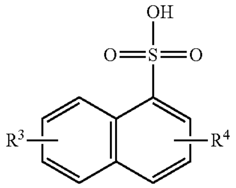

$R^3$, $R^4$ are independently from each other selected from hydrogen, methyl, ethyl, propyl, butyl, hydroxyl group.

Even more preferably, Component a) is a condensate polymer obtained from the condensation of formaldehyde and one or more selected from naphthalene, methylnaphthalene, ethylnaphthalene, butylnaphthalene, hydroxynaphthalene.

To reach a good fluidity in the concrete, the weight-average molecular weight of Component a) is from 1,000 to 100,000 and preferably from 2,000 to 50,000 and even more preferably from 5,000 to 30,000.

Preferably, Component b) is a copolymer of the structure of Formula III and one or more selected from the structure of Formula IV-(a) and Formula IV-(b), and/or a condensate polymer obtained from the condensation of formaldehyde with the structure of Formula V and Formula VI:

Formula III

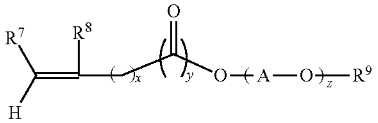

Formula IV-(a)

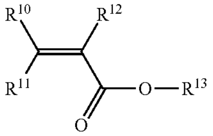

Formula IV-(b)

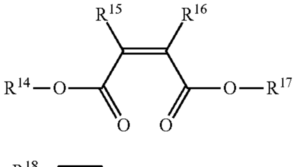

Formula V

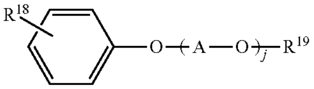

Formula VI

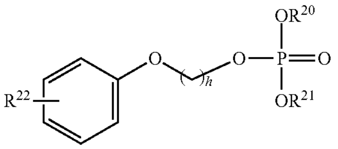

$R^7$, $R^8$, $R^{10}$, $R^{11}$, $R^{12}$, $R^{15}$, $R^{16}$, $R^{18}$, $R^{22}$ are independently from each other selected from hydrogen, methyl and ethyl group; $R^9$, $R^{19}$ are independently from each other selected from hydrogen and alkyl group having carbon number from 1 to 30; $R^{13}$, $R^{14}$ and $R^{17}$ are independently from each other selected from hydrogen, methyl, ethyl, hydroxy propyl, alkaline metal, alkaline earth metal, ammonium and amine; $R^{20}$ and $R^{21}$, are independently from each other selected from hydrogen, alkyl group having carbon number from 1 to 4; A is alkylene group having carbon number from 2 to 18; x is an integer number from 0 to 2; y is an integer number from 0 to 1; h is selected from an integer number from 1 to 3; z and j are independently from each other selected from an integer number from 1 to 500.

More preferably, Component b) is a copolymer of the structure of Formula III and one or more selected from the structure of Formula IV-(a) and Formula IV-(b), and/or a condensate polymer obtained from the condensation of formaldehyde with the structure of Formula V and Formula VI:

Formula III

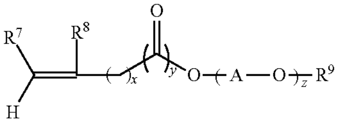

Formula IV-(a)

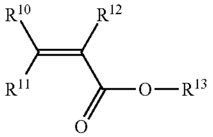

-continued

Formula IV-(b)

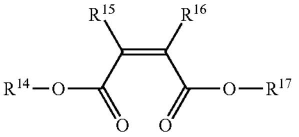

Formula V

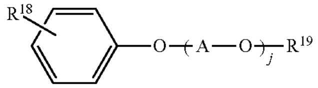

Formula VI

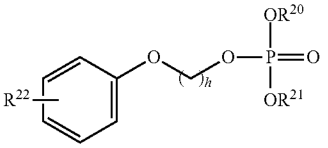

$R^7$, $R^8$, $R^{10}$, $R^{11}$, $R^{12}$, $R^5$, $R^{16}$, $R^{18}$, $R^{22}$ are independently from each other selected from hydrogen and methyl group; $R^9$, $R^{19}$ are independently from each other selected from hydrogen and alkyl group having carbon number from 1 to 30; $R^{13}$, $R^{14}$ and $R^{17}$ are independently from each other selected from hydrogen, methyl, ethyl, hydroxy propyl, alkaline metal, alkaline earth metal, ammonium and amine; $R^{20}$ and $R^{21}$ are independently from each other selected from hydrogen, alkyl group having carbon number from 1 to 4; A is alkylene group having carbon number from 2 to 4; x is an integer number from 0 to 2; y is an integer number from 0 to 1; h is selected from an integer number from 1 to 3; z and j are independently from each other selected from an integer number from 1 to 250.

To reach a good fluidity in the concrete, the weight-average molecular weight of Component b) is from 1,000 to 500,000 and preferably from 5,000 to 200,000 and even more preferably from 10,000 to 100,000.

The ratio by weight of said Component a) to Component b) is preferably from 1:10 to 10:1 and more preferably from 1:3 to 3:1 and most preferably from 1:2 to 2:1.

Component c) is added into the mixture of Component a) and Component b) to stabilize the mixture and avoid thickening of the dispersant. Preferably, Component c) is the structure of Formula I:

Formula I

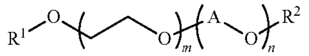

$R^1$ is hydrogen or alky group having carbon number not less than 1 and no more than 34, cycloalkyl or cycloalkenyl group having carbon number not less than 3 and no more than 8, alkenyl group having carbon number not less than 2 and no more than 18, aryl group having carbon number not less than 6; $R^2$ is hydrogen or alky group having carbon number from 1 to 3; A is alkylene group having carbon number from 3 or 4; m is an integer number selected from 5 to 11 and n is an integer number selected from 1 to 7, wherein m is more than n and the sum of m and n is more than 9 and less than 12.

More preferably, Component c) is a mixture of at least one selected from Group I consist of polyoxyalkylene [polyoxyethylene(5) polyoxybuthylene(4)] nonyl ether, polyoxyalkylene [polyoxyethylene(6) polyoxybuthylene(3)] nonyl ether, polyoxyalkylene [polyoxyethylene(7) polyoxybuthylene(2)] nonyl ether, polyoxyalkylene [polyoxyethylene(8) polyoxybuthylene(1)] nonyl ether, polyoxyalkylene [polyoxyethylene(5) polyoxybuthylene(4)] decyl ether, polyoxyalkylene [polyoxyethylene(6) polyoxybuthylene(3)] decyl ether, polyoxyalkylene [polyoxyethylene(7) polyoxybuthylene(2)] decyl ether, polyoxyalkylene [polyoxyethylene(8) polyoxybuthylene(1)] decyl ether, polyoxyalkylene [polyoxyethylene(5) polyoxybuthylene(4)] undecyl ether, polyoxyalkylene [polyoxyethylene(6) polyoxybuthylene(3)] undecyl ether, polyoxyalkylene [polyoxyethylene(7) polyoxybuthylene(2)] undecyl ether, polyoxyalkylene [polyoxyethylene(8) polyoxybuthylene(1)] undecyl ether, polyoxyalkylene [polyoxyethylene(5) polyoxybuthylene(4)] tridecyl ether, polyoxyalkylene [polyoxyethylene(6) polyoxybuthylene(3)] tridecyl ether, polyoxyalkylene [polyoxyethylene(7) polyoxybuthylene(2)] tridecyl ether, polyoxyalkylene [polyoxyethylene(8) polyoxybuthylene(1)] tridecyl ether, polyoxyalkylene [polyoxyethylene(5) polyoxybuthylene(4)] pentadecyl ether, polyoxyalkylene [polyoxyethylene(6) polyoxybuthylene(3)] pentadecyl ether, polyoxyalkylene [polyoxyethylene(7) polyoxybuthylene(2)] pentadecyl ether, polyoxyalkylene [polyoxyethylene(8) polyoxybuthylene(1)] pentadecyl ether, polyoxyalkylene [polyoxyethylene (5)polyoxypropylene(4)] 2-propylheptanol ether, polyoxyalkylene [polyoxyethylene(6)polyoxypropylene(3)] 2-propylheptanol ether, polyoxyalkylene [polyoxyethylene (7)polyoxypropylene(2)] 2-propylheptanol ether, polyoxyalkylene [polyoxyethylene(8)polyoxypropylene(1)] 2-propylheptanol ether; and at least one selected from Group II consist of polyoxyalkylene [polyoxyethylene(6) polyoxybuthylene(4)] nonyl ether, polyoxyalkylene [polyoxyethylene(7) polyoxybuthylene(3)] nonyl ether, polyoxyalkylene [polyoxyethylene(8) polyoxybuthylene(2)] nonyl ether, polyoxyalkylene [polyoxyethylene(9) polyoxybuthylene(1)] nonyl ether, polyoxyalkylene [polyoxyethylene(6) polyoxybuthylene(5)] nonyl ether, polyoxyalkylene [polyoxyethylene(7) polyoxybuthylene(4)] nonyl ether, polyoxyalkylene [polyoxyethylene(8) polyoxybuthylene(3)] nonyl ether, polyoxyalkylene [polyoxyethylene(9) polyoxybuthylene(2)] nonyl ether, polyoxyalkylene [polyoxyethylene(10) polyoxybuthylene(1)] nonyl ether, polyoxyalkylene [polyoxyethylene(6) polyoxybuthylene(4)] decyl ether, polyoxyalkylene [polyoxyethylene(7) polyoxybuthylene(3)] decyl ether, polyoxyalkylene [polyoxyethylene(8) polyoxybuthylene(2)] decyl ether, polyoxyalkylene [polyoxyethylene(9) polyoxybuthylene(1)] decyl ether, polyoxyalkylene [polyoxyethylene(6) polyoxybuthylene(5)] decyl ether, polyoxyalkylene [polyoxyethylene(7) polyoxybuthylene(4)] decyl ether, polyoxyalkylene [polyoxyethylene(8) polyoxybuthylene(3)] decyl ether, polyoxyalkylene [polyoxyethylene(9) polyoxybuthylene(2)] decyl ether, polyoxyalkylene [polyoxyethylene(10) polyoxybuthylene(1)] decyl ether, polyoxyalkylene [polyoxyethylene(6) polyoxybuthylene(4)] undecyl ether, polyoxyalkylene [polyoxyethylene(7) polyoxybuthylene(3)] undecyl ether, polyoxyalkylene [polyoxyethylene(8) polyoxybuthylene(2)] undecyl ether, polyoxyalkylene [polyoxyethylene(9) polyoxybuthylene(1)] undecyl ether, polyoxyalkylene [polyoxyethylene(6) polyoxybuthylene(5)] undecyl ether, polyoxyalkylene [polyoxyethylene(7) polyoxybuthylene(4)] undecyl ether, polyoxyalkylene [polyoxyethylene(8) polyoxybuthylene(3)] undecyl ether, polyoxyalkylene [polyoxyethylene(9) polyoxybuthylene(2)] undecyl ether, polyoxyalkylene [polyoxyethylene(10) polyoxybuthylene(1)] undecyl ether, polyoxyalkylene [polyoxyethylene(6) polyoxybuthylene(4)] tridecyl ether, polyoxyalkylene [polyoxyethylene(7) polyoxybuthylene(3)] tridecyl ether, polyoxyalkylene [polyoxyethylene(8) polyoxybuthylene(2)] tridecyl ether, polyoxyalkylene [polyoxyethylene(9) polyoxybuthylene(1)] tridecyl ether, polyoxyalkylene [polyoxyethylene(6) polyoxybuthylene(5)] tridecyl ether, polyoxyalkylene [polyoxyethylene(7) polyoxybuthylene(4)] tridecyl ether, polyoxyalkylene [polyoxyethylene(8) polyoxybuthylene(3)] tridecyl ether, polyoxyalkylene [polyoxyethylene(9) polyoxybuthylene(2)] tridecyl ether, polyoxyalkylene [polyoxyethylene(10) polyoxybuthylene(1)] tridecyl ether, polyoxyalkylene [polyoxyethylene(6) polyoxybuthylene(4)] pentadecyl ether, polyoxyalkylene [polyoxyethylene(7) polyoxybuthylene(3)] pentadecyl ether, polyoxyalkylene [polyoxyethylene(8) polyoxybuthylene(2)] pentadecyl ether, polyoxyalkylene [polyoxyethylene(9) polyoxybuthylene(1)] pentadecyl ether, polyoxyalkylene [polyoxyethylene(6) polyoxybuthylene(5)] pentadecyl ether, polyoxyalkylene [polyoxyethylene(7) polyoxybuthylene(4)] pentadecyl ether, polyoxyalkylene [polyoxyethylene (8) polyoxybuthylene(3)] pentadecyl ether, polyoxyalkylene [polyoxyethylene(9) polyoxybuthylene(2)] pentadecyl ether, polyoxyalkylene [polyoxyethylene(10) polyoxybuthylene(1)] pentadecyl ether, polyoxyalkylene [polyoxyethylene(6)polyoxypropylene(4)] 2-propylheptanol ether, polyoxyalkylene [polyoxyethylene(7)polyoxypropylene(3)] 2-propylheptanol ether, polyoxyalkylene [polyoxyethylene (8)polyoxypropylene(2)] 2-propylheptanol ether, polyoxyalkylene [polyoxyethylene(9)polyoxypropylene(1)] 2-propylheptanol ether, polyoxyalkylene [polyoxyethylene(6) polyoxypropylene(5)] 2-propylheptanol ether, polyoxyalkylene [polyoxyethylene(7)polyoxypropylene(4)] 2-propylheptanol ether, polyoxyalkylene [polyoxyethylene (8)polyoxypropylene(3)] 2-propylheptanol ether, polyoxyalkylene [polyoxyethylene(9)polyoxypropylene(2)] 2-propylheptanol ether, polyoxyalkylene [polyoxyethylene(10) polyoxypropylene(1)] 2-propylheptanol ether and Group III consist of polyoxyalkylene [polyoxyethylene(7) polyoxybuthylene(5)] nonyl ether, polyoxyalkylene [polyoxyethylene(8) polyoxybuthylene(4)] nonyl ether, polyoxyalkylene [polyoxyethylene(9) polyoxybuthylene(3)] nonyl ether, polyoxyalkylene [polyoxyethylene(10) polyoxybuthylene (2)] nonyl ether, polyoxyalkylene [polyoxyethylene(11) polyoxybuthylene(1)] nonyl ether, polyoxyalkylene [polyoxyethylene(7) poyoxybuthylene(5)] decyl ether, polyoxyalkylene [polyoxyethylene(8) polyoxybuthylene(4)] decyl ether, polyoxyalkylene [polyoxyethylene(9) polyoxybuthylene(3)] decyl ether, polyoxyalkylene [polyoxyethylene(10) polyoxybuthylene(2)] decyl ether, polyoxyalkylene [polyoxyethylene(11) polyoxybuthylene(1)] decyl ether, polyoxyalkylene [polyoxyethylene(7) polyoxybuthylene(5)] undecyl ether, polyoxyalkylene [polyoxyethylene(8) polyoxybuthylene(4)] undecyl ether, polyoxyalkylene [polyoxyethylene(9) polyoxybuthylene(3)] undecyl ether, polyoxyalkylene [polyoxyethylene(10) polyoxybuthylene(2)] undecyl ether, polyoxyalkylene [polyoxyethylene(11) polyoxybuthylene(1)] undecyl ether, polyoxyalkylene [polyoxyethylene (7) polyoxybuthylene(5)] tridecyl ether, polyoxyalkylene [polyoxyethylene(8) polyoxybuthylene(4)] tridecyl ether, polyoxyalkylene [polyoxyethylene(9) polyoxybuthylene(3)] tridecyl ether, polyoxyalkylene [polyoxyethylene(10) polyoxybuthylene(2)] tridecyl ether, polyoxyalkylene [polyoxyethylene(11) polyoxybuthylene(1)] tridecyl ether, polyoxyalkylene [polyoxyethylene(7) polyoxybuthylene(5)] pentadecyl ether, polyoxyalkylene [polyoxyethylene(8) polyoxybuthylene(4)] pentadecyl ether, polyoxyalkylene [polyoxyethylene(9) polyoxybuthylene(3)] pentadecyl ether, polyoxyalkylene [polyoxyethylene(10) polyoxybuthylene(2)] pentadecyl ether, polyoxyalkylene [polyoxyethylene(11) polyoxybuthylene(1)] pentadecyl ether, polyoxyalkylene [polyoxyethylene(7)polyoxypropylene(5)] 2-propylheptanol ether, polyoxyalkylene [polyoxyethylene (8)polyoxypropylene(4)] 2-propylheptanol jhk'ether polyoxyalkylene [polyoxyethylene(9)polyoxypropylene(3)] 2-propylheptanol ether, polyoxyalkylene [polyoxyethylene (10)polyoxypropylene(2)] 2-propylheptanol ether, polyoxyalkylene [polyoxyethylene(11)polyoxypropylene(1)] 2-propylheptanol ether.

More preferably, Component c) is a mixture of at least one selected from Group III consist of polyoxyalkylene [polyoxyethylene(7) polyoxybuthylene(5)] nonyl ether, polyoxyalkylene [polyoxyethylene(8) polyoxybuthylene(4)] nonyl ether, polyoxyalkylene [polyoxyethylene(9) polyoxybuthylene(3)] nonyl ether, polyoxyalkylene [polyoxyethylene(10) polyoxybuthylene(2)] nonyl ether, polyoxyalkylene [polyoxyethylene(11) polyoxybuthylene(1)] nonyl ether, polyoxyalkylene [polyoxyethylene(7) polyoxybuthylene(5)] decyl ether, polyoxyalkylene [polyoxyethylene(8) polyoxybuthylene(4)] decyl ether, polyoxyalkylene [polyoxyethylene(9) polyoxybuthylene(3)] decyl ether, polyoxyalkylene [polyoxyethylene(10) polyoxybuthylene(2)] decyl ether, polyoxyalkylene [polyoxyethylene(11) polyoxybuthylene (1)] decyl ether, polyoxyalkylene [polyoxyethylene(7) polyoxybuthylene(5)] undecyl ether, polyoxyalkylene [polyoxyethylene(8) polyoxybuthylene(4)] undecyl ether, polyoxyalkylene [polyoxyethylene(9) polyoxybuthylene(3)] undecyl ether, polyoxyalkylene [polyoxyethylene(10) polyoxybuthylene(2)] undecyl ether, polyoxyalkylene [polyoxyethylene(11) polyoxybuthylene(1)] undecyl ether, polyoxyalkylene [polyoxyethylene(7) polyoxybuthylene(5)] tridecyl ether, polyoxyalkylene [polyoxyethylene(8) polyoxybuthylene(4)] tridecyl ether, polyoxyalkylene [polyoxyethylene(9) polyoxybuthylene(3)] tridecyl ether, polyoxyalkylene [polyoxyethylene(10) polyoxybuthylene(2)] tridecyl ether, polyoxyalkylene [polyoxyethylene(11) polyoxybuthylene(1)] tridecyl ether, polyoxyalkylene [polyoxyethylene(7) polyoxybuthylene(5)] pentadecyl ether, polyoxyalkylene [polyoxyethylene(8) polyoxybuthylene(4)] pentadecyl ether, polyoxyalkylene [polyoxyethylene(9) polyoxybuthylene(3)] pentadecyl ether, polyoxyalkylene [polyoxyethylene(10) polyoxybuthylene(2)] pentadecyl ether, polyoxyalkylene [polyoxyethylene(11) polyoxybuthylene(1)] pentadecyl ether, polyoxyalkylene [polyoxyethylene(7)polyoxypropylene(5)] 2-propylheptanol ether, polyoxyalkylene [polyoxyethylene(8)polyoxypropylene(4)] 2-propylheptanol jhk'ether polyoxyalkylene [polyoxyethylene(9)polyoxypropylene(3)] 2-propylheptanol ether, polyoxyalkylene [polyoxyethylene(10)polyoxypropylene(2)] 2-propylheptanol ether, polyoxyalkylene [polyoxyethylene(11)polyoxypropylene(1)] 2-propylheptanol ether; and at least one selected from Group I consist of polyoxyalkylene [polyoxyethylene (5) polyoxybuthylene(4)] nonyl ether, polyoxyalkylene [polyoxyethylene(6) polyoxybuthylene(3)] nonyl ether, polyoxyalkylene [polyoxyethylene(7) polyoxybuthylene(2)] nonyl ether, polyoxyalkylene [polyoxyethylene(8) polyoxybuthylene(1)] nonyl ether, polyoxyalkylene [polyoxyethylene(5) polyoxybuthylene(4)] decyl ether, polyoxyalkylene [polyoxyethylene(6) polyoxybuthylene(3)] decyl ether, polyoxyalkylene [polyoxyethylene(7) polyoxybuthylene(2)] decyl ether, polyoxyalkylene [polyoxyethylene(8) polyoxybuthylene(1)] decyl ether, polyoxyalkylene [polyoxyethylene(5) polyoxybuthylene(4)]undecyl ether, polyoxyalkylene [polyoxyethylene(6) polyoxybuthylene(3)] undecyl ether, polyoxyalkylene [polyoxyethylene(7) polyoxybuthylene(2)] undecyl ether, polyoxyalkylene [polyoxyethylene(8) polyoxybuthylene(1)] undecyl ether, polyoxyalkylene [polyoxyethylene(5) polyoxybuthylene(4)] tridecyl ether, polyoxyalkylene [polyoxyethylene(6) polyoxybuthylene(3)] tridecyl ether, polyoxyalkylene [polyoxyethylene(7) polyoxybuthylene(2)] tridecyl ether, polyoxyalkylene [polyoxyethylene(8) polyoxybuthylene(1)] tridecyl ether, polyoxyalkylene [polyoxyethylene(5) polyoxybuthylene(4)] pentadecyl ether, polyoxyalkylene [polyoxyethylene(6) polyoxybuthylene(3)] pentadecyl ether, polyoxyalkylene [polyoxyethylene(7) polyoxybuthylene(2)] pentadecyl ether, polyoxyalkylene [polyoxyethylene(8) polyoxybuthylene(1)] pentadecyl ether, polyoxyalkylene [polyoxyethylene(5)polyoxypropylene(4)] 2-propylheptanol ether, polyoxyalkylene [polyoxyethylene(6)polyoxypropylene(3)] 2-propylheptanol ether, polyoxyalkylene [polyoxyethylene(7)polyoxypropylene(2)] 2-propylheptanol ether, polyoxyalkylene [polyoxyethylene (8)polyoxypropylene(1)] 2-propylheptanol ether and Group II consist of polyoxyalkylene [polyoxyethylene(6) polyoxybuthylene(4)] nonyl ether, polyoxyalkylene [polyoxyethylene(7) polyoxybuthylene(3)] nonyl ether, polyoxyalkylene [polyoxyethylene(8) polyoxybuthylene(2)] nonyl ether, polyoxyalkylene [polyoxyethylene(9) polyoxybuthylene(1)] nonyl ether, polyoxyalkylene [polyoxyethylene(6) polyoxybuthylene(5)] nonyl ether, polyoxyalkylene [polyoxyethylene(7) polyoxybuthylene(4)] nonyl ether, polyoxyalkylene [polyoxyethylene(8) polyoxybuthylene(3)] nonyl ether, polyoxyalkylene [polyoxyethylene(9) polyoxybuthylene(2)] nonyl ether, polyoxyalkylene [polyoxyethylene(10) polyoxybuthylene(1)] nonyl ether, polyoxyalkylene [polyoxyethylene(6) polyoxybuthylene(4)] decyl ether, polyoxyalkylene [polyoxyethylene(7) polyoxybuthylene(3)] decyl ether, polyoxyalkylene [polyoxyethylene(8) polyoxybuthylene(2)] decyl ether, polyoxyalkylene [polyoxyethylene(9) polyoxybuthylene(1)] decyl ether, polyoxyalkylene [polyoxyethylene(6) polyoxybuthylene(5)] decyl ether, polyoxyalkylene [polyoxyethylene(7) polyoxybuthylene(4)] decyl ether, polyoxyalkylene [polyoxyethylene(8) polyoxybuthylene(3)] decyl ether, polyoxyalkylene [polyoxyethylene(9) polyoxybuthylene(2)] decyl ether, polyoxyalkylene [polyoxyethylene(10) polyoxybuthylene(1)] decyl ether, polyoxyalkylene [polyoxyethylene(6) polyoxybuthylene(4)] undecyl ether, polyoxyalkylene [polyoxyethylene(7) polyoxybuthylene(3)] undecyl ether, polyoxyalkylene [polyoxyethylene(8) polyoxybuthylene(2)] undecyl ether, polyoxyalkylene [polyoxyethylene(9) polyoxybuthylene(1)] undecyl ether, polyoxyalkylene [polyoxyethylene(6) polyoxybuthylene(5)] undecyl ether, polyoxyalkylene [polyoxyethylene(7) polyoxybuthylene(4)] undecyl ether, polyoxyalkylene [polyoxyethylene(8) polyoxybuthylene(3)] undecyl ether, polyoxyalkylene [polyoxyethylene(9) polyoxybuthylene(2)] undecyl ether, polyoxyalkylene [polyoxyethylene(10) polyoxybuthylene(1)] undecyl ether, polyoxyalkylene [polyoxyethylene(6) polyoxybuthylene(4)] tridecyl ether, polyoxyalkylene [polyoxyethylene(7) polyoxybuthylene(3)] tridecyl ether, polyoxyalkylene [polyoxyethylene(8) polyoxybuthylene(2)] tridecyl ether, polyoxyalkylene [polyoxyethylene(9) polyoxybuthylene(1)] tridecyl ether, polyoxyalkylene [polyoxyethylene(6) polyoxybuthylene(5)] tridecyl ether, polyoxyalkylene [polyoxyethylene(7) polyoxybuthylene(4)] tridecyl ether, polyoxyalkylene [polyoxyethylene(8) polyoxybuthylene(3)] tridecyl ether, polyoxyalkylene [polyoxyethylene(9) polyoxybuthylene(2)] tridecyl ether, polyoxyalkylene [polyoxyethylene(10) polyoxybuthylene(1)] tridecyl ether, polyoxyalkylene [polyoxyethylene(6) polyoxybuthylene(4)] pentadecyl ether, polyoxyalkylene [polyoxyethylene(7) polyoxybuthylene(3)] pentadecyl ether, polyoxyalkylene [polyoxyethylene(8) polyoxybuthylene(2)]

pentadecyl ether, polyoxyalkylene [polyoxyethylene(9) polyoxybuthylene(1)] pentadecyl ether, polyoxyalkylene [polyoxyethylene(6) polyoxybuthylene(5)] pentadecyl ether, polyoxyalkylene [polyoxyethylene(7) polyoxybuthylene(4)] pentadecyl ether, polyoxyalkylene [polyoxyethylene (8) polyoxybuthylene(3)] pentadecyl ether, polyoxyalkylene [polyoxyethylene(9) polyoxybuthylene(2)] pentadecyl ether, polyoxyalkylene [polyoxyethylene(10) polyoxybuthylene(1)] pentadecyl ether, polyoxyalkylene [polyoxyethylene(6)polyoxypropylene(4)] 2-propylheptanol ether, polyoxyalkylene [polyoxyethylene(7)polyoxypropylene(3)] 2-propylheptanol ether, polyoxyalkylene [polyoxyethylene (8)polyoxypropylene(2)] 2-propylheptanol ether, polyoxyalkylene [polyoxyethylene(9)polyoxypropylene(1)] 2-propylheptanol ether, polyoxyalkylene [polyoxyethylene(6) polyoxypropylene(5)] 2-propylheptanol ether, polyoxyalkylene [polyoxyethylene(7)polyoxypropylene(4)] 2-propylheptanol ether, polyoxyalkylene [polyoxyethylene (8)polyoxypropylene(3)] 2-propylheptanol ether, polyoxyalkylene [polyoxyethylene(9)polyoxypropylene(2)] 2-propylheptanol ether, polyoxyalkylene (polyoxyethylene(10) polyoxypropylene(1)] 2-propylheptanol ether.

More preferably, Component c) is at least one selected from Group II consist of polyoxyalkylene [polyoxyethylene (6) polyoxybuthylene(4)] nonyl ether, polyoxyalkylene [polyoxyethylene(7) polyoxybuthylene(3)] nonyl ether, polyoxyalkylene [polyoxyethylene(8) polyoxybuthylene(2)] nonyl ether, polyoxyalkylene [polyoxyethylene(9) polyoxybuthylene(1)] nonyl ether, polyoxyalkylene [polyoxyethylene(6) polyoxybuthylene(5)] nonyl ether, polyoxyalkylene [polyoxyethylene(7) polyoxybuthylene(4)] nonyl ether, polyoxyalkylene [polyoxyethylene(8) polyoxybuthylene(3)] nonyl ether, polyoxyalkylene [polyoxyethylene(9) polyoxybuthylene(2)] nonyl ether, polyoxyalkylene [polyoxyethylene(10) polyoxybuthylene(1)] nonyl ether, polyoxyalkylene [polyoxyethylene(6) polyoxybuthylene(4)] decyl ether, polyoxyalkylene [polyoxyethylene(7) polyoxybuthylene(3)] decyl ether, polyoxyalkylene [polyoxyethylene(8) polyoxybuthylene(2)] decyl ether, polyoxyalkylene [polyoxyethylene(9) polyoxybuthylene(1)] decyl ether, polyoxyalkylene [polyoxyethylene(6) polyoxybuthylene(5)] decyl ether, polyoxyalkylene [polyoxyethylene(7) polyoxybuthylene(4)] decyl ether, polyoxyalkylene [polyoxyethylene(8) polyoxybuthylene(3)] decyl ether, polyoxyalkylene [polyoxyethylene(9) polyoxybuthylene(2)] decyl ether, polyoxyalkylene [polyoxyethylene(10) polyoxybuthylene(1)] decyl ether, polyoxyalkylene [polyoxyethylene(6) polyoxybuthylene(4)] undecyl ether, polyoxyalkylene [polyoxyethylene(7) polyoxybuthylene(3)] undecyl ether, polyoxyalkylene [polyoxyethylene(8) polyoxybuthylene(2)] undecyl ether, polyoxyalkylene [polyoxyethylene(9) polyoxybuthylene(1)] undecyl ether, polyoxyalkylene [polyoxyethylene(6) polyoxybuthylene(5)] undecyl ether, polyoxyalkylene [polyoxyethylene(7) polyoxybuthylene(4)] undecyl ether, polyoxyalkylene [polyoxyethylene(8) polyoxybuthylene(3)] undecyl ether, polyoxyalkylene [polyoxyethylene(9) polyoxybuthylene(2)] undecyl ether, polyoxyalkylene [polyoxyethylene(10) polyoxybuthylene(1)] undecyl ether, polyoxyalkylene [polyoxyethylene(6) polyoxybuthylene(4)] tridecyl ether, polyoxyalkylene [polyoxyethylene(7) polyoxybuthylene(3)] tridecyl ether, polyoxyalkylene [polyoxyethylene(8) polyoxybuthylene(2)] tridecyl ether, polyoxyalkylene [polyoxyethylene(9) polyoxybuthylene(1)] tridecyl ether, polyoxyalkylene [polyoxyethylene(6) polyoxybuthylene(5)] tridecyl ether, polyoxyalkylene [polyoxyethylene(7) polyoxybuthylene(4)] tridecyl ether, polyoxyalkylene [polyoxyethylene(8) polyoxybuthylene(3)] tridecyl ether, polyoxyalkylene [polyoxyethylene(9) polyoxybuthylene(2)] tridecyl ether, polyoxyalkylene [polyoxyethylene(10) polyoxybuthylene(1)] tridecyl ether, polyoxyalkylene [polyoxyethylene(6) polyoxybuthylene(4)] pentadecyl ether, polyoxyalkylene [polyoxyethylene(7) polyoxybuthylene(3)] pentadecyl ether, polyoxyalkylene [polyoxyethylene(8) polyoxybuthylene(2)] pentadecyl ether, polyoxyalkylene [polyoxyethylene(9) polyoxybuthylene(1)] pentadecyl ether, polyoxyalkylene [polyoxyethylene(6) polyoxybuthylene(5)] pentadecyl ether, polyoxyalkylene [polyoxyethylene(7) polyoxybuthylene(4)] pentadecyl ether, polyoxyalkylene [polyoxyethylene (8) polyoxybuthylene(3)] pentadecyl ether, polyoxyalkylene [polyoxyethylene(9) polyoxybuthylene(2)] pentadecyl ether, polyoxyalkylene [polyoxyethylene(10) polyoxybuthylene(1)] pentadecyl ether, polyoxyalkylene [polyoxyethylene(6)polyoxypropylene(4)] 2-propylheptanol ether, polyoxyalkylene [polyoxyethylene(7)polyoxypropylene(3)] 2-propylheptanol ether, polyoxyalkylene [polyoxyethylene (8)polyoxypropylene(2)] 2-propylheptanol ether, polyoxyalkylene [polyoxyethylene(9)polyoxypropylene(1)] 2-propylheptanol ether, polyoxyalkylene [polyoxyethylene(6) polyoxypropylene(5)] 2-propylheptanol ether, polyoxyalkylene [polyoxyethylene(7)polyoxypropylene(4)] 2-propylheptanol ether, polyoxyalkylene [polyoxyethylene (8)polyoxypropylene(3)] 2-propylheptanol ether, polyoxyalkylene [polyoxyethylene(9)polyoxypropylene(2)] 2-propylheptanol ether, polyoxyalkylene [polyoxyethylene(10) polyoxypropylene(1)] 2-propylheptanol ether.

The ratio by weight of said Component c) to the sum of Component a) and b) is preferably from 1:100 to 1:5 and preferably from 1:50 to 1:6.

The dispersant composition comprising Component a), b) and c) is preferably used in the mortar or concrete as the superplasticizer. When it is used, the weight percentage of said composition is preferably from 0.01% to 2.5% based on the weight of cement in mortar. The dispersant composition is preferably dissolved in water to get an aqueous composition that is added into the mortar or concrete with the ratio by weight of the composition and water from 1:10 to 1:1 and preferably from 1:6 to 1:1.5.

<Technical Effect>

High air content in the mortar leads to a good flowability but tends to decrease the compressive strength of the cured concrete. The Component c) of this invention solved this problem and the concrete added with the dispersant composition shows excellent flowability, workability as well as high compressive strength. The outstanding compressive strength is correlated with the low air content in the concrete.

Embodiment

The 1$^{st}$ embodiment is the dispersant composition comprising Component a) that is a condensate polymer obtained from the condensation of formaldehyde with the structure of Formula II-(a):

Formula II-(a)

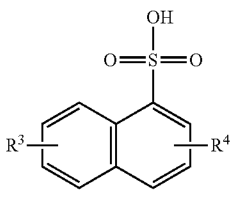

$R^3$, $R^4$ are independently from each other selected from hydrogen, methyl and ethyl group; and Component b) that is a copolymer of the structure of Formula III and Formula IV-(a):

Formula III

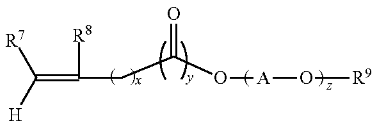

Formula IV-(a)

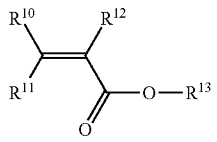

$R^7$, $R^8$, $R^{10}$, $R^{11}$, $R^{12}$ are independently from each other selected from hydrogen, methyl and ethyl group, $R^9$ is selected from hydrogen and alkyl group having carbon number from 1 to 30, $R^{13}$ is selected from hydrogen, methyl, ethyl, hydroxy propyl, alkaline metal, alkaline earth metal, ammonium and amine, A is alkylene group having carbon number from 2 to 18, x is an integer number from 0 to 2, y is an integer number from 0 to 1, z is selected from an integer number from 1 to 500; and Component c) that is a mixture of at least one selected from Group I and at least one selected from Group II and Group III.

The $2^{nd}$ embodiment is the dispersant composition comprising Component a) that is a condensate polymer obtained from the condensation of formaldehyde with the structure of Formula II-(a):

Formula II-(a)

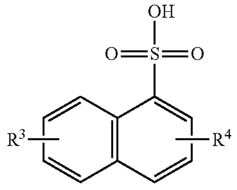

$R^3$, $R^4$ are independently from each other selected from hydrogen, methyl and ethyl group; and Component b) that is a copolymer of the structure of Formula III and Formula IV-(a):

Formula III

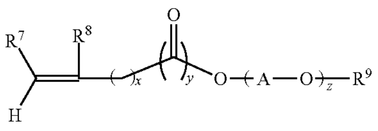

Formula IV-(a)

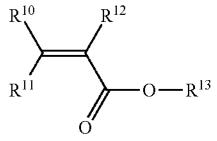

$R^7$, $R^8$, $R^{10}$, $R^{11}$, $R^{12}$ are independently from each other selected from hydrogen, methyl and ethyl group, $R^9$ is selected from hydrogen and alkyl group having carbon number from 1 to 30, $R^{13}$ is selected from hydrogen, methyl, ethyl, hydroxy propyl, alkaline metal, alkaline earth metal, ammonium and amine, A is alkylene group having carbon number from 2 to 18, x is an integer number from 0 to 2, y is an integer number from 0 to 1, z is selected from an integer number from 1 to 500; and Component c) that is a mixture of at least one selected from Group III and at least one selected from Group I and Group II.

The $3^{rd}$ embodiment is the dispersant composition comprising Component a) that is a condensate polymer obtained from the condensation of formaldehyde with the structure of Formula II-(a):

Formula II-(a)

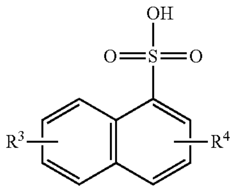

$R^3$, $R^4$ are independently from each other selected from hydrogen, methyl and ethyl group; and Component b) that is a copolymer of the structure of Formula III and Formula IV-(a):

Formula III

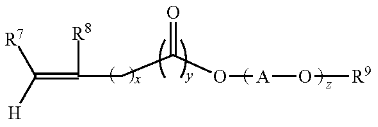

Formula IV-(a)

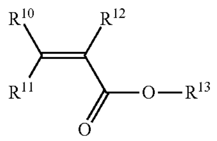

$R^7$, $R^8$, $R^{10}$, $R^{11}$, $R^{12}$ are independently from each other selected from hydrogen, methyl and ethyl group, $R^9$ is selected from hydrogen and alkyl group having carbon number from 1 to 30, $R^{13}$ is selected from hydrogen, methyl, ethyl, hydroxy propyl, alkaline metal, alkaline earth metal, ammonium and amine, A is alkylene group having carbon number from 2 to 18, x is an integer number from 0 to 2, y is an integer number from 0 to 1, z is selected from an integer number from 1 to 500; and Component c) that is at least one selected from Group II.

The $4^{th}$ embodiment is the dispersant composition comprising Component a) that is a condensate polymer obtained from the condensation of formaldehyde with the structure of Formula II-(a):

Formula II-(a)

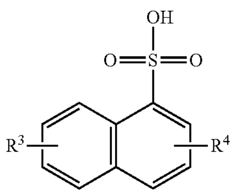

$R^3$, $R^4$ are independently from each other selected from hydrogen, methyl and ethyl group; and Component b) that is a copolymer of the structure of Formula III and Formula IV-(b):

Formula III

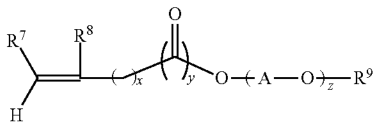

Formula IV-(b)

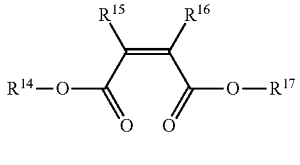

$R^7$, $R^8$, $R^{15}$, $R^{16}$ are independently from each other selected from hydrogen, methyl and ethyl group, $R^9$ is selected from hydrogen and alkyl group having carbon number from 1 to 30, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2, y is an integer number from 0 to 1, z is selected from an integer number from 1 to 500; and Component c) that is a mixture of at least one selected from Group I and at least one selected from Group II and Group III.

The 5$^{th}$ embodiment is the dispersant composition comprising Component a) that is a condensate polymer obtained from the condensation of formaldehyde with the structure of Formula II-(a):

Formula II-(a)

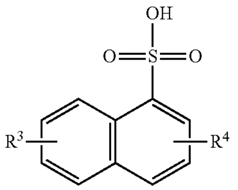

$R^3$, $R^4$ are independently from each other selected from hydrogen, methyl and ethyl group; and Component b) that is a copolymer of the structure of Formula III and Formula IV-(b):

Formula III

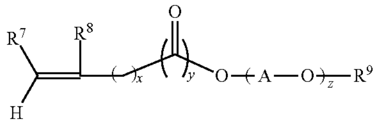

Formula IV-(b)

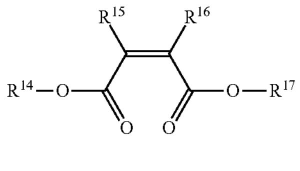

$R^7$, $R^8$, $R^{15}$, $R^{16}$ are independently from each other selected from hydrogen, methyl and ethyl group, $R^9$ is selected from hydrogen and alkyl group having carbon number from 1 to 30, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2, y is an integer number from 0 to 1, z is selected from an integer number from 1 to 500; and Component c) that is a mixture of at least one selected from Group III and at least one selected from Group I and Group II.

The 6$^{th}$ embodiment is the dispersant composition comprising Component a) that is a condensate polymer obtained from the condensation of formaldehyde with the structure of Formula II-(a):

Formula II-(a)

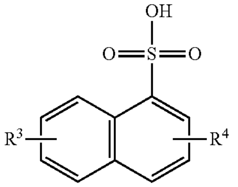

$R^3$, $R^4$ are independently from each other selected from hydrogen, methyl and ethyl group; and Component b) that is a copolymer of the structure of Formula III and Formula IV-(b):

Formula III

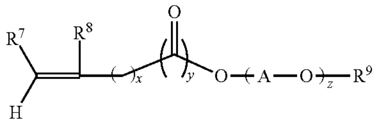

Formula IV-(b)

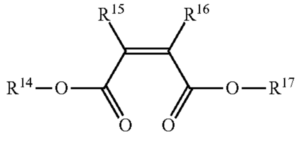

$R^7$, $R^8$, $R^{15}$, $R^{16}$ are independently from each other selected from hydrogen, methyl and ethyl group, $R^9$ is selected from hydrogen and alkyl group having carbon number from 1 to 30, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2, y is an integer number from 0 to 1, z is selected from an integer number from 1 to 500; and Component c) that is at least one selected from Group II.

The 7$^{th}$ embodiment is the dispersant composition comprising Component a) that is a condensate polymer obtained from the condensation of formaldehyde with the structure of Formula II-(a):

Formula II-(a)

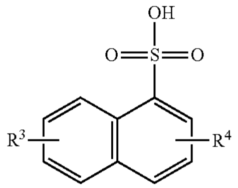

$R^3$, $R^4$ are independently from each other selected from hydrogen, methyl and ethyl group; and Component b) that is a copolymer of the structure of Formula II and Formula IV-(a) and IV-(b):

Formula III

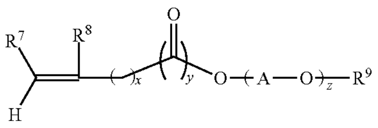

Formula IV-(a)

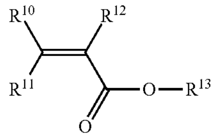

Formula IV-(b)

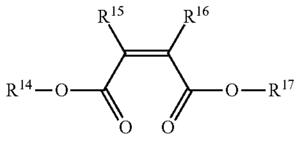

$R^7$, $R^8$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^{13}$, $R^1$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an Integer number from 0 to 1, z is selected from an integer number from 1 to 500; and Component c) that is a mixture of at least one selected from Group I and at least one selected from Group II and Group III.

The $8^{th}$ embodiment is the dispersant composition comprising Component a) that is a condensate polymer obtained from the condensation of formaldehyde with the structure of Formula II-(a):

Formula II-(a)

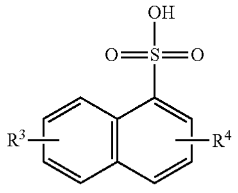

$R^3$, $R^4$ are independently from each other selected from hydrogen, methyl and ethyl group; and Component b) that is a copolymer of the structure of Formula III and Formula IV-(a) and IV-(b):

Formula III

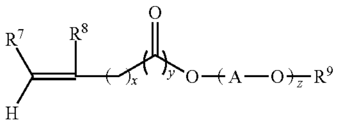

Formula IV-(a)

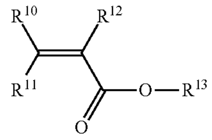

Formula IV-(b)

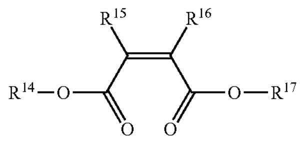

$R^7$, $R^8$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^3$, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500; and Component c) that is a mixture of at least one selected from Group III and at least one selected from Group I and Group II.

The $9^{th}$ embodiment is the dispersant composition comprising Component a) that is a condensate polymer obtained from the condensation of formaldehyde with the structure of Formula II-(a):

Formula II-(a)

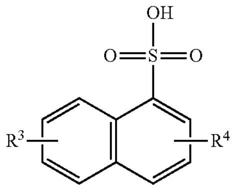

$R^3$, $R^4$ are independently from each other selected from hydrogen, methyl and ethyl group; and Component b) that is a copolymer of the structure of Formula III and Formula IV-(a) and IV-(b):

Formula III

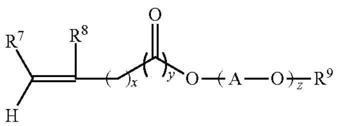

Formula IV-(a)

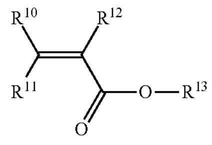

-continued

Formula IV-(b)

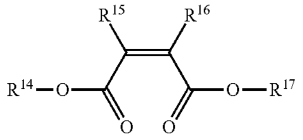

$R^7$, $R^8$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^{13}$, $R^4$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500; and Component c) that is at least one selected from Group II.

The $10^{th}$ embodiment is the dispersant composition comprising Component a) that is a condensate polymer obtained from the condensation of formaldehyde with the structure of Formula II-(a):

Formula II-(a)

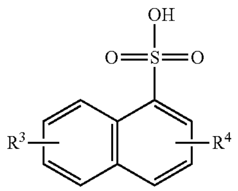

$R^3$, $R^4$ are independently from each other selected from hydrogen, methyl and ethyl group; and Component b) that is a condensate polymer obtained from the condensation of formaldehyde with the structure of Formula V and Formula VI:

Formula V

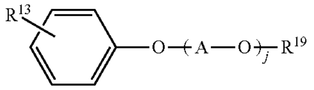

Formula VI

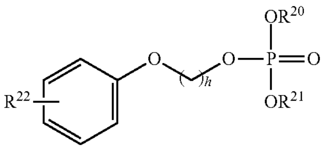

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) that is a mixture of at least one selected from Group I and at least one selected from Group II and Group III.

The $11^{th}$ embodiment is the dispersant composition comprising Component a) that is a condensate polymer obtained from the condensation of formaldehyde with the structure of Formula II-(a):

Formula II-(a)

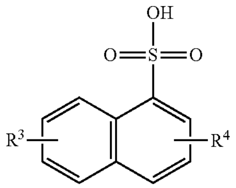

$R^3$, $R^4$ are independently from each other selected from hydrogen, methyl and ethyl group; and Component b) that is a condensate polymer obtained from the condensation of formaldehyde with the structure of Formula V and Formula VI:

Formula V

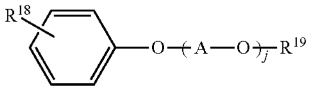

Formula VI

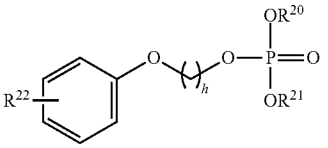

$R^{18}$, $R^{22}$ are independently from each other selected from hydrogen, methyl and ethyl group, $R^1$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) that is a mixture of at least one selected from Group III and at least one selected from Group I and Group II.

The $12^{th}$ embodiment is the dispersant composition comprising Component a) that is a condensate polymer obtained from the condensation of formaldehyde with the structure of Formula II-(a):

Formula II-(a)

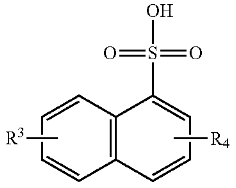

$R^3$, $R^4$ are independently from each other selected from hydrogen, methyl and ethyl group; and Component b) that is a condensate polymer obtained from the condensation of formaldehyde with the structure of Formula V and Formula VI:

Formula V

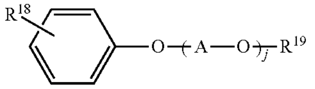

-continued

Formula VI

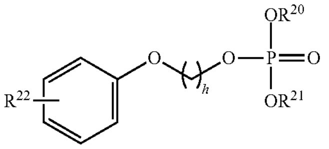

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) that is at least one selected from Group II.

The 13$^{th}$ embodiment is the dispersant composition comprising Component a) that is a condensate polymer obtained from the condensation of formaldehyde with the structure of Formula II-(a) and Formula II-(b):

Formula II-(a)

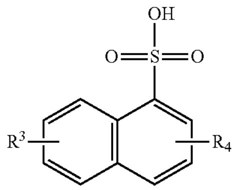

Formula II-(b)

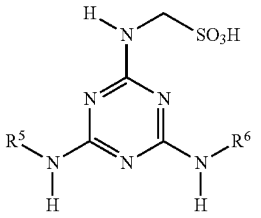

$R^3$, $R^4$, $R^5$, $R^6$ are independently from each other selected from hydrogen, methyl and ethyl group; and Component b) that is a copolymer of the structure of Formula III and Formula IV-(a):

Formula III

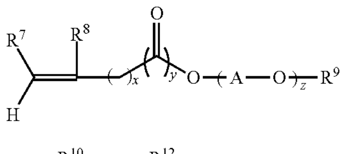

Formula IV-(a)

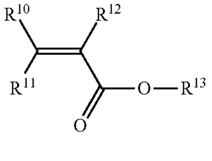

$R^7$, $R^8$, $R^{10}$, $R^{11}$, $R^{12}$ are independently from each other selected from hydrogen, methyl and ethyl group, $R^9$ is selected from hydrogen and alkyl group having carbon number from 1 to 30, $R^{13}$ is selected from hydrogen, methyl, ethyl, hydroxy propyl, alkaline metal, alkaline earth metal, ammonium and amine, A is alkylene group having carbon number from 2 to 18, x is an integer number from 0 to 2, y is an integer number from 0 to 1, z is selected from an integer number from 1 to 500; and Component c) that is a mixture of at least one selected from Group I and at least one selected from Group II and Group III.

The 14$^{th}$ embodiment is the dispersant composition comprising Component a) that is a condensate polymer obtained from the condensation of formaldehyde with the structure of Formula II-(a) and Formula II-(b):

Formula II-(a)

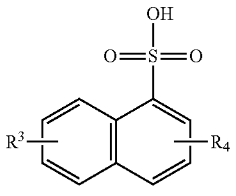

Formula II-(b)

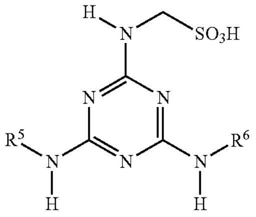

$R^3$, $R^4$, $R^5$, $R^6$ are independently from each other selected from hydrogen, methyl and ethyl group; and Component b) that is a copolymer of the structure of Formula III and Formula IV-(a):

Formula III

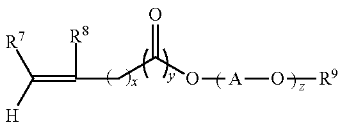

Formula IV-(a)

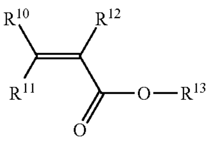

$R^7$, $R^8$, $R^{10}$, $R^{11}$, $R^{12}$ are independently from each other selected from hydrogen, methyl and ethyl group, $R^9$ is selected from hydrogen and alkyl group having carbon number from 1 to 30, $R^{13}$ is selected from hydrogen, methyl, ethyl, hydroxy propyl, alkaline metal, alkaline earth metal, ammonium and amine, A is alkylene group having carbon number from 2 to 18, x is an integer number from 0 to 2, y is an integer number from 0 to 1, z is selected from an integer number from 1 to 500; and Component c) that is a mixture of at least one selected from Group II and at least one selected from Group I and Group II.

The 15$^{th}$ embodiment is the dispersant composition comprising Component a) that is a condensate polymer obtained from the condensation of formaldehyde with the structure of Formula II-(a) and Formula II-(b):

Formula II-(a)

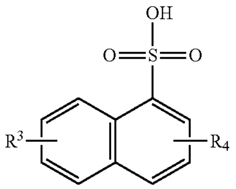

Formula II-(b)

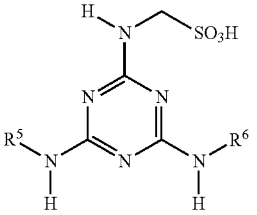

$R^3$, $R^4$, $R^5$, $R^6$ are independently from each other selected from hydrogen, methyl and ethyl group; and Component b) that is a copolymer of the structure of Formula III and Formula IV-(a):

Formula III

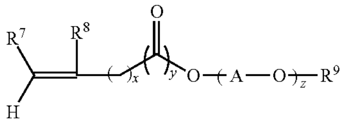

Formula IV-(a)

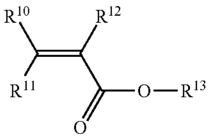

$R^7$, $R^8$, $R^{10}$, $R^{11}$, $R^{12}$ are independently from each other selected from hydrogen, methyl and ethyl group, $R^9$ is selected from hydrogen and alkyl group having carbon number from 1 to 30, $R^{13}$ is selected from hydrogen, methyl, ethyl, hydroxy propyl, alkaline metal, alkaline earth metal, ammonium and amine, A is alkylene group having carbon number from 2 to 18, x is an integer number from 0 to 2, y is an integer number from 0 to 1, z is selected from an integer number from 1 to 500; and Component c) that is at least one selected from Group II.

The $16^{th}$ embodiment is the dispersant composition comprising Component a) that is a condensate polymer obtained from the condensation of formaldehyde with the structure of Formula II-(a) and Formula II-(b):

Formula II-(a)

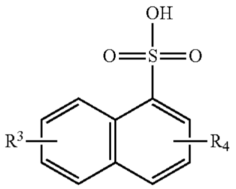

-continued

Formula II-(b)

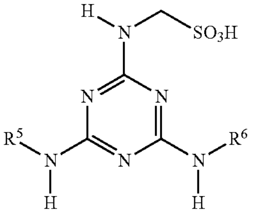

$R^3$, $R^4$, $R^5$, $R^6$ are independently from each other selected from hydrogen, methyl and ethyl group; and Component b) that is a condensate polymer obtained from the condensation of formaldehyde with the structure of Formula V and Formula VI:

Formula V

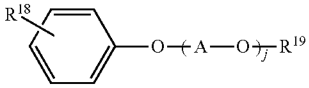

Formula VI

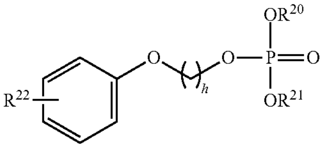

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) that is a mixture of at least one selected from Group I and at least one selected from Group II and Group III.

The $17^{th}$ embodiment is the dispersant composition comprising Component a) that is a condensate polymer obtained from the condensation of formaldehyde with the structure of Formula II-(a) and Formula II-(b):

Formula II-(a)

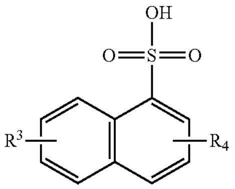

Formula II-(b)

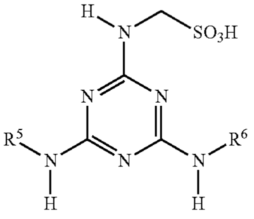

$R^3$, $R^4$, $R^5$, $R^6$ are independently from each other selected from hydrogen, methyl and ethyl group; and Component b)

that is a condensate polymer obtained from the condensation of formaldehyde with the structure of Formula V and Formula VI:

Formula V

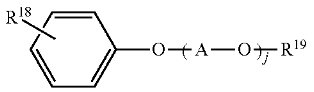

Formula VI

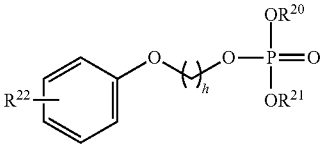

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) that is a mixture of at least one selected from Group II and at least one selected from Group I and Group II.

The 18$^{th}$ embodiment is the dispersant composition comprising Component a) that is a condensate polymer obtained from the condensation of formaldehyde with the structure of Formula II-(a) and Formula II-(b):

Formula II-(a)

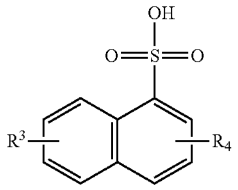

Formula II-(b)

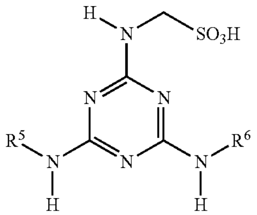

$R^3$, $R^4$, $R^5$, $R^6$ are independently from each other selected from hydrogen, methyl and ethyl group; and Component b) that is a condensate polymer obtained from the condensation of formaldehyde with the structure of Formula V and Formula VI:

Formula V

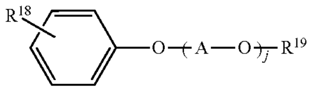

-continued

Formula VI

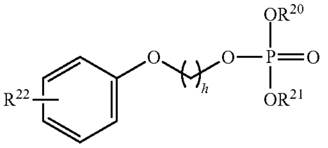

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) that is at least one selected from Group II.

The 19$^{th}$ embodiment is the dispersant composition comprising Component a) that is a condensate polymer obtained from the condensation of formaldehyde with the structure of Formula II-(b):

Formula II-(b)

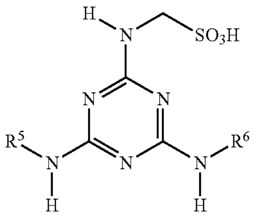

$R^5$, $R^6$ are independently from each other selected from hydrogen, methyl and ethyl group; and Component b) that is a copolymer of the structure of Formula III and Formula IV-(a):

Formula III

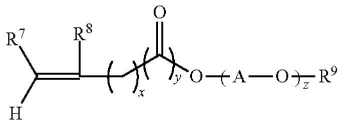

Formula IV-(a)

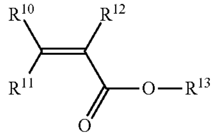

$R^7$, $R^8$, $R^{10}$, $R^{11}$, $R^{12}$ are independently from each other selected from hydrogen, methyl and ethyl group, $R^9$ is selected from hydrogen and alkyl group having carbon number from 1 to 30, $R^{13}$ is selected from hydrogen, methyl, ethyl, hydroxy propyl, alkaline metal, alkaline earth metal, ammonium and amine, A is alkylene group having carbon number from 2 to 18, x is an integer number from 0 to 2, y is an integer number from 0 to 1, z is selected from an integer number from 1 to 500; and Component c) that is a mixture of at least one selected from Group I and at least one selected from Group II and Group III.

The 20$^{th}$ embodiment is the dispersant composition comprising Component a) that is a condensate polymer obtained from the condensation of formaldehyde with the structure of Formula II-(b):

Formula II-(b)

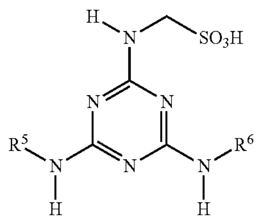

$R^5$, $R^6$ are independently from each other selected from hydrogen, methyl and ethyl group; and Component b) that is a copolymer of the structure of Formula III and Formula IV-(a):

Formula III

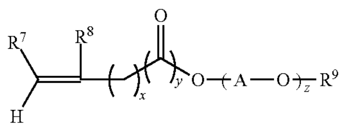

Formula IV-(a)

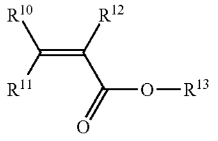

$R^7$, $R^8$, $R^{10}$, $R^{11}$, $R^{12}$ are independently from each other selected from hydrogen, methyl and ethyl group, $R^9$ is selected from hydrogen and alkyl group having carbon number from 1 to 30, $R^{13}$ is selected from hydrogen, methyl, ethyl, hydroxy propyl, alkaline metal, alkaline earth metal, ammonium and amine, A is alkylene group having carbon number from 2 to 18, x is an integer number from 0 to 2, y is an integer number from 0 to 1, z is selected from an integer number from 1 to 500; and Component c) that is a mixture of at least one selected from Group III and at least one selected from Group I and Group II.

The $21^{st}$ embodiment is the dispersant composition comprising Component a) that is a condensate polymer obtained from the condensation of formaldehyde with the structure of Formula II-(b):

Formula II-(b)

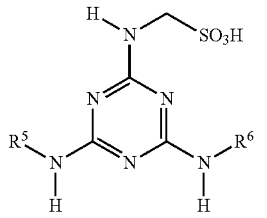

$R^5$, $R^6$ are independently from each other selected from hydrogen, methyl and ethyl group; and Component b) that is a copolymer of the structure of Formula III and Formula IV-(a):

Formula III

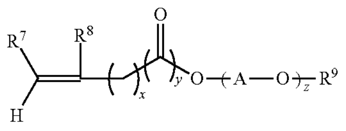

Formula IV-(a)

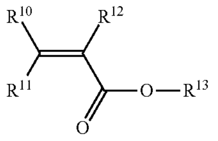

$R^7$, $R^8$, $R^{10}$, $R^{11}$, $R^{12}$ are independently from each other selected from hydrogen, methyl and ethyl group, $R^9$ is selected from hydrogen and alkyl group having carbon number from 1 to 30, $R^{13}$ is selected from hydrogen, methyl, ethyl, hydroxy propyl, alkaline metal, alkaline earth metal, ammonium and amine, A is alkylene group having carbon number from 2 to 18, x is an integer number from 0 to 2, y is an integer number from 0 to 1, z is selected from an integer number from 1 to 500; and Component c) that is at least one selected from Group II.

The $22^{nd}$ embodiment is the dispersant composition comprising Component a) that is a condensate polymer obtained from the condensation of formaldehyde with the structure of Formula II-(b):

Formula II-(b)

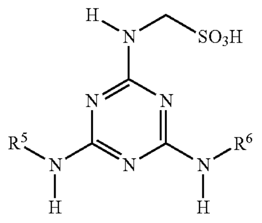

$R^5$, $R^6$ are independently from each other selected from hydrogen, methyl and ethyl group; Component b) that is a copolymer of the structure of Formula III and Formula IV-(a) and IV-(b):

Formula III

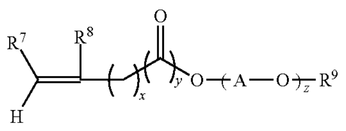

Formula IV-(a)

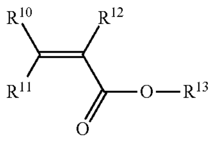

Formula IV-(b)

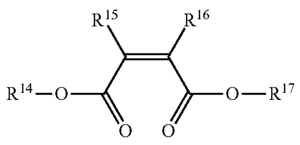

$R^7$, $R^8$, $R^{10}$, $R^{11}$, $R^{12}$, $R^{15}$, $R^{16}$ are independently from each other selected from hydrogen, methyl and ethyl group;

$R^9$ is selected from hydrogen and alkyl group having carbon number from 1 to 30, $R^{13}$, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500; and Component c) that is a mixture of at least one selected from Group I and at least one selected from Group I and Group III.

The 23$^{rd}$ embodiment is the dispersant composition comprising Component a) that is a condensate polymer obtained from the condensation of formaldehyde with the structure of Formula II-(b):

Formula II-(b)

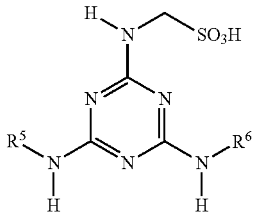

$R^5$, $R^6$ are independently from each other selected from hydrogen, methyl and ethyl group; Component b) that is a copolymer of the structure of Formula III and Formula IV-(a) and IV-(b):

Formula III

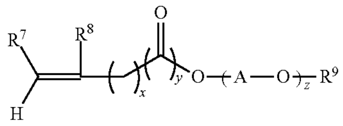

Formula IV-(a)

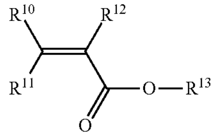

Formula IV-(b)

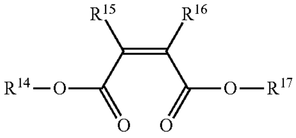

$R^7$, $R^8$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^{13}$, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500; and Component c) that is a mixture of at least one selected from Group III and at least one selected from Group I and Group II.

The 24$^{th}$ embodiment is the dispersant composition comprising Component a) that is a condensate polymer obtained from the condensation of formaldehyde with the structure of Formula II-(b):

Formula II-(b)

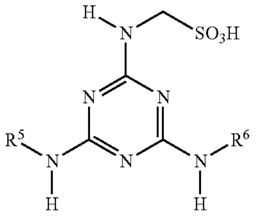

$R^5$, $R^6$ are independently from each other selected from hydrogen, methyl and ethyl group; and Component b) that is a copolymer of the structure of Formula III and Formula IV-(a) and IV-(b):

Formula III

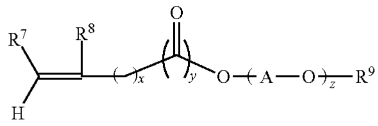

Formula IV-(a)

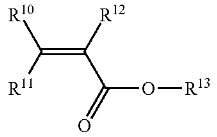

Formula IV-(b)

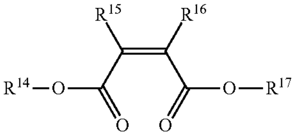

$R^7$, $R^8$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^{13}$, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500; and Component c) that is a mixture of at least one selected from Group III and at least one selected from Group I and Group II.

The 25$^{th}$ embodiment is the dispersant composition comprising Component a) that is a condensate polymer obtained from the condensation of formaldehyde with the structure of Formula II-(b):

Formula II-(b)

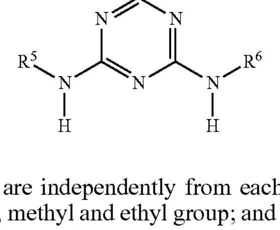

$R^5$, $R^6$ are independently from each other selected from hydrogen, methyl and ethyl group; and Component b) that is a copolymer of the structure of Formula III and Formula IV-(b):

Formula III

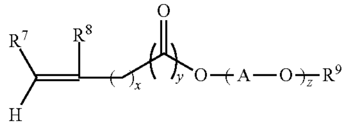

Formula IV-(b)

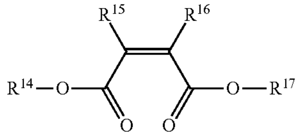

$R^7$, $R^8$, $R^{15}$, $R^{16}$ are independently from each other selected from hydrogen, methyl and ethyl group; $R^9$ is selected from hydrogen and alkyl group having carbon number from 1 to 30, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500; and Component c) that is a mixture of at least one selected from Group I and at least one selected from Group II and Group III.

The 26$^{th}$ embodiment is the dispersant composition comprising Component a) that is a condensate polymer obtained from the condensation of formaldehyde with the structure of Formula II-(b):

Formula II-(b)

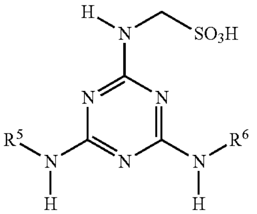

$R^5$, $R^6$ are independently from each other selected from hydrogen, methyl and ethyl group; Component b) that is a copolymer of the structure of Formula III and Formula IV-(b):

Formula III

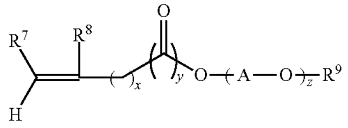

Formula IV-(b)

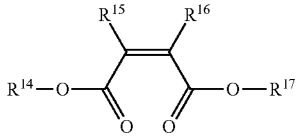

$R^7$, $R^8$, $R^{15}$, $R^{16}$ are independently from each other selected from hydrogen, methyl and ethyl group; $R^9$ is selected from hydrogen and alkyl group having carbon number from 1 to 30, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500; and Component c) that is a mixture of at least one selected from Group III and at least one selected from Group I and Group II.

The 27$^{th}$ embodiment is the dispersant composition comprising Component a) that is a condensate polymer obtained from the condensation of formaldehyde with the structure of Formula II-(b):

Formula II-(b)

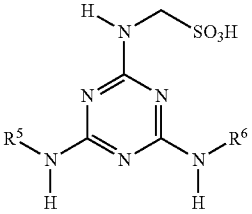

$R^5$, $R^6$ are independently from each other selected from hydrogen, methyl and ethyl group; Component b) that is a copolymer of the structure of Formula II and Formula IV-(b):

Formula III

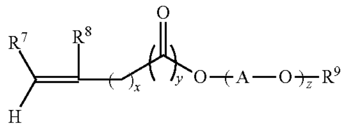

Formula IV-(b)

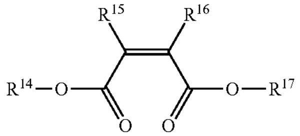

$R^7$, $R^8$, $R^{15}$, $R^{16}$ are independently from each other selected from hydrogen, methyl and ethyl group; $R^9$ is selected from hydrogen and alkyl group having carbon number from 1 to 30, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500; and Component c) that is at least one selected from Group II.

The 28$^{th}$ embodiment is the dispersant composition comprising Component a) that is a condensate polymer obtained from the condensation of formaldehyde with the structure of Formula II-(b):

Formula II-(b)

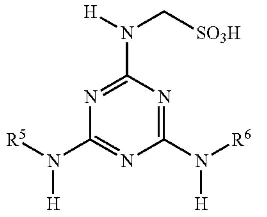

$R^5$, $R^6$ are independently from each other selected from hydrogen, methyl and ethyl group; and Component b) that is a condensate polymer obtained from the condensation of formaldehyde with the structure of Formula V and Formula VI:

Formula V

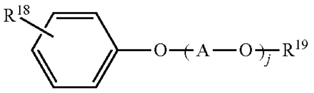

Formula VI

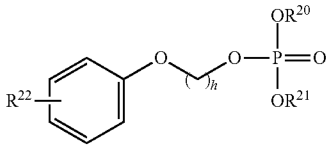

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) that is a mixture of at least one selected from Group I and at least one selected from Group II and Group III.

The 29$^{th}$ embodiment is the dispersant composition comprising Component a) that is a condensate polymer obtained from the condensation of formaldehyde with the structure of Formula II-(b):

Formula II-(b)

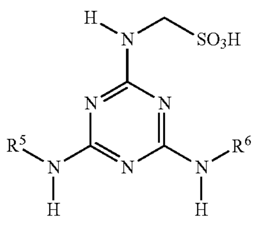

$R^5$, $R^6$ are independently from each other selected from hydrogen, methyl and ethyl group; and Component b) that is a condensate polymer obtained from the condensation of formaldehyde with the structure of Formula V and Formula VI:

Formula V

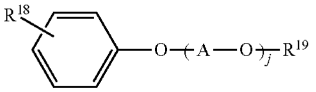

Formula VI

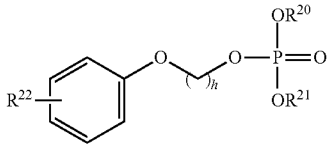

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) that is a mixture of at least one selected from Group III and at least one selected from Group I and Group II.

The 30$^{th}$ embodiment is the dispersant composition comprising Component a) that is a condensate polymer obtained from the condensation of formaldehyde with the structure of Formula II-(b):

Formula II-(b)

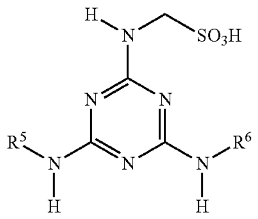

$R^5$, $R^6$ are independently from each other selected from hydrogen, methyl and ethyl group; and Component b) that is a condensate polymer obtained from the condensation of formaldehyde with the structure of Formula V and Formula VI:

Formula V

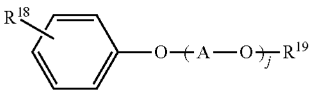

Formula VI

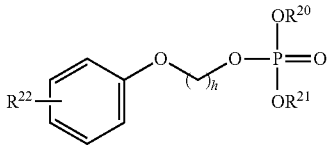

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) that is at least one selected from Group II.

The $31^{st}$ embodiment is the dispersant composition comprising Component a) that is a condensate polymer obtained from the condensation of formaldehyde with the structure of Formula II-(a) and Formula II-(b):

Formula II-(a)

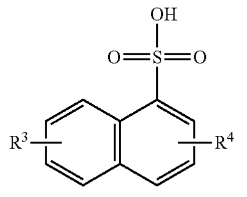

Formula II-(b)

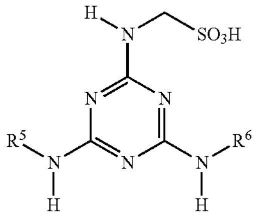

$R^3$, $R^4$, $R^5$, $R^5$ are independently from each other selected from hydrogen, methyl and ethyl group; and Component b) that is a copolymer of the structure of Formula III and Formula IV-(b):

Formula III

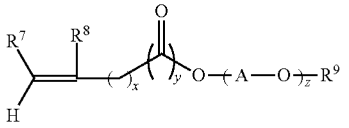

Formula IV-(b)

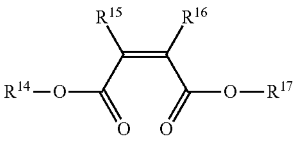

$R^7$, $R^8$, $R^{15}$, $R^{16}$ are independently from each other selected from hydrogen, methyl and ethyl group; $R^9$ is selected from hydrogen and alkyl group having carbon number from 1 to 30, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500; and Component c) that is a mixture of at least one selected from Group I and at least one selected from Group II and Group III.

The $32^{nd}$ embodiment is the dispersant composition comprising Component a) that is a condensate polymer obtained from the condensation of formaldehyde with the structure of Formula II-(a) and Formula II-(b):

Formula II-(a)

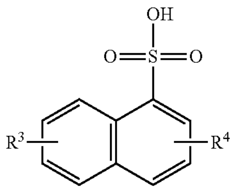

Formula II-(b)

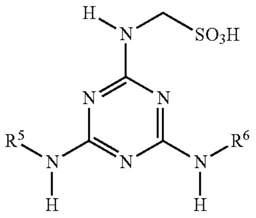

$R^3$, $R^4$, $R^5$, $R^6$ are independently from each other selected from hydrogen, methyl and ethyl group; and Component b) that is a copolymer of the structure of Formula III and Formula IV-(b):

Formula III

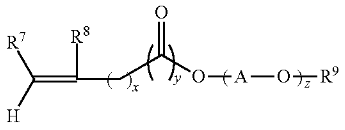

Formula IV-(b)

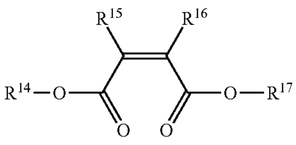

$R^7$, $R^8$, $R^{15}$, $R^{16}$ are independently from each other selected from hydrogen, methyl and ethyl group; $R^9$ is selected from hydrogen and alkyl group having carbon number from 1 to 30, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500; and Component c) that is a mixture of at least one selected from Group III and at least one selected from Group I and Group II.

The $33^{rd}$ embodiment is the dispersant composition comprising Component a) that is a condensate polymer obtained from the condensation of formaldehyde with the structure of Formula II-(a) and Formula II-(b):

Formula II-(a)

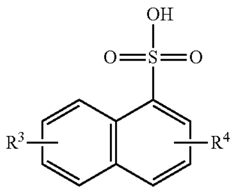

-continued

Formula II-(b)

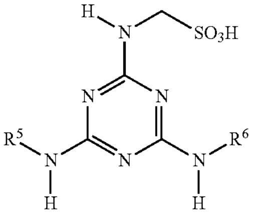

$R^3$, $R^4$, $R^5$, $R^6$ are independently from each other selected from hydrogen, methyl and ethyl group; and Component b) that is a copolymer of the structure of Formula III and Formula IV-(b):

Formula III

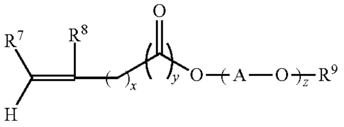

Formula IV-(b)

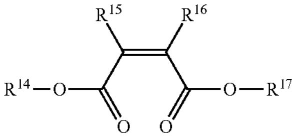

$R^7$, $R^8$, $R^{15}$, $R^{16}$ are independently from each other selected from hydrogen, methyl and ethyl group; $R^9$ is selected from hydrogen and alkyl group having carbon number from 1 to 30, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500; and Component c) that is at least one selected from Group II.

The 34$^{th}$ embodiment is the dispersant composition comprising Component a) that is a condensate polymer obtained from the condensation of formaldehyde with the structure of Formula II-(a) and Formula II-(b):

Formula II-(a)

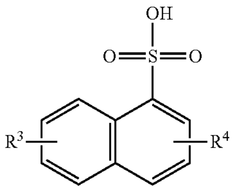

Formula II-(b)

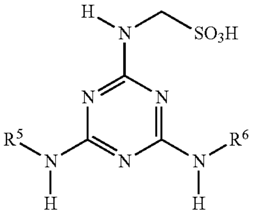

$R^3$, $R^4$, $R^5$, $R^8$ are independently from each other selected from hydrogen, methyl an ethyl group; and Component b) that is a copolymer of the structure of Formula III and Formula IV-(a) and IV-(b):

Formula III

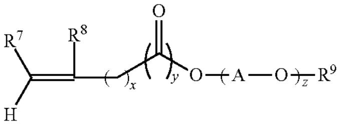

Formula IV-(a)

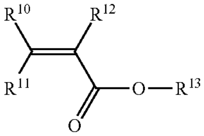

Formula IV-(b)

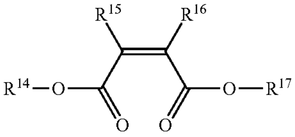

$R^7$, $R^8$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^{13}$, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500; and Component c) that is a mixture of at least one selected from Group I and at least one selected from Group II and Group III.

The 35$^{th}$ embodiment is the dispersant composition comprising Component a) that is a condensate polymer obtained from the condensation of formaldehyde with the structure of Formula II-(a) and Formula II-(b):

Formula II-(a)

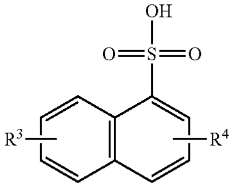

Formula II-(b)

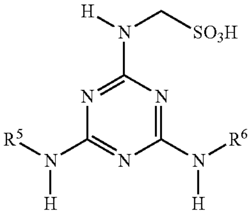

$R^3$, $R^4$, $R^5$, $R^6$ are independently from each other selected from hydrogen, methyl and ethyl group; and Component b) that is a copolymer of the structure of Formula III and Formula IV-(a) and IV-(b):

Formula III

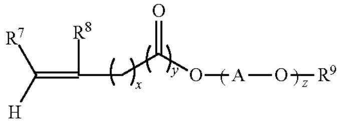

Formula IV-(a)

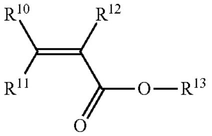

Formula IV-(b)

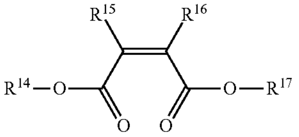

$R^7$, $R^8$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^3$, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500; and Component c) that is a mixture of at least one selected from Group III and at least one selected from Group I and Group II.

The 36th embodiment is the dispersant composition comprising Component a) that is a condensate polymer obtained from the condensation of formaldehyde with the structure of Formula II-(a) and Formula II-(b):

Formula II-(a)

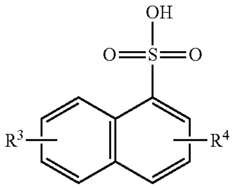

Formula II-(b)

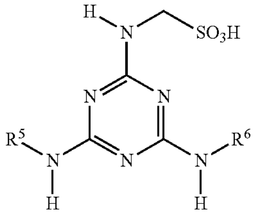

$R^3$, $R^4$, $R^5$, $R^6$ are independently from each other selected from hydrogen, methyl and ethyl group; and Component b) that is a copolymer of the structure of Formula III and Formula IV-(a) and IV-(b):

Formula III

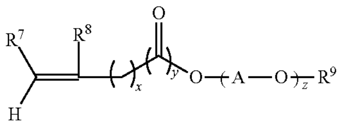

-continued

Formula IV-(a)

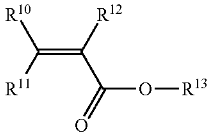

Formula IV-(b)

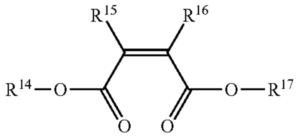

$R^7$, $R^8$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^{13}$, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500; and Component c) that is at least one selected from Group II.

The 37th embodiment is the dispersant composition comprising Component a) that is a condensate polymer obtained from the condensation of formaldehyde with the structure of Formula II-(a):

Formula II-(a)

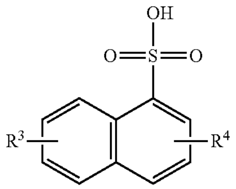

$R^3$ and $R^4$ are independently from each other selected from hydrogen, methyl and ethyl group; and Component b) that is a mixture of a copolymer of Formula III and Formula IV-(a):

Formula III

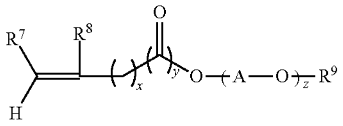

Formula IV-(a)

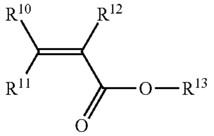

$R^7$, $R^8$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^{13}$ is selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

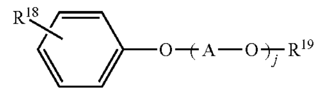

Formula VI

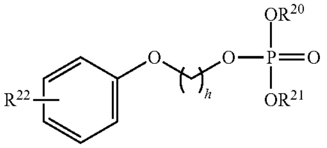

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) that is a mixture of at least one selected from Group I and at least one selected from Group II and Group III.

The 38$^{th}$ embodiment is the dispersant composition comprising Component a) that is a condensate polymer obtained from the condensation of formaldehyde with the structure of Formula II-(a):

Formula II-(a)

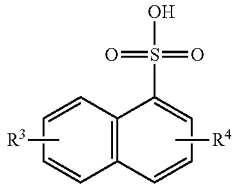

$R^3$ and $R^4$ are independently from each other selected from hydrogen, methyl and ethyl group; and Component b) that is a mixture of a copolymer of Formula III and Formula IV-(a):

Formula III

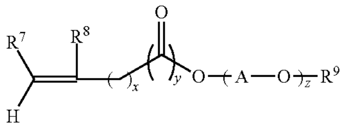

Formula IV-(a)

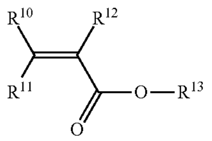

$R^7$, $R^8$, $R^{10}$, $R^1$, $R^{12}$, $R^{15}$, $R^{16}$ are independently from each other selected from hydrogen, methyl and ethyl group; $R^9$ is selected from hydrogen and alkyl group having carbon number from 1 to 30, $R^{13}$ is selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

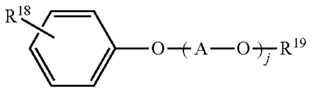

Formula VI

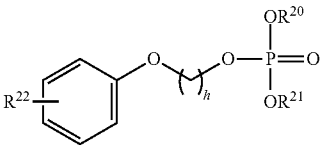

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) that is a mixture of at least one selected from Group III and at least one selected from Group I and Group II.

The 39$^{th}$ embodiment is the dispersant composition comprising Component a) that is a condensate polymer obtained from the condensation of formaldehyde with the structure of Formula II-(a):

Formula II-(a)

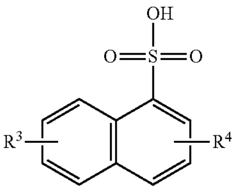

$R^3$ and $R^4$ are independently from each other selected from hydrogen, methyl and ethyl group; and Component b) that is a mixture of a copolymer of Formula III and Formula IV-(a):

Formula III

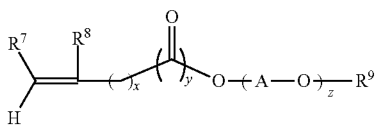

Formula IV-(a)

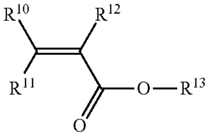

$R^7$, $R^8$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^{13}$ is selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

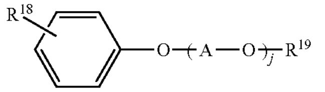

Formula VI

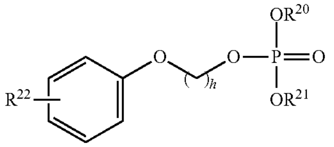

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) that is at least one selected from Group II.

The 40$^{th}$ embodiment is the dispersant composition comprising Component a) that is a condensate polymer obtained from the condensation of formaldehyde with the structure of Formula II-(a):

Formula II-(a)

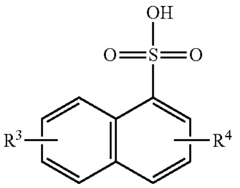

$R^3$ and $R^4$ are independently from each other selected from hydrogen, methyl and ethyl group; and Component b) that is a mixture of a copolymer of the structure of Formula III and Formula IV-(b):

Formula III

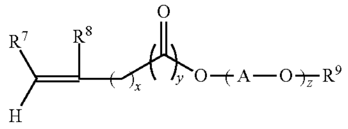

Formula IV-(b)

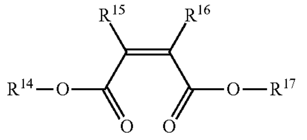

$R^7$, $R^8$, $R^5$, $R^{16}$ are independently from each other selected from hydrogen, methyl and ethyl group; $R^9$ is selected from hydrogen and alkyl group having carbon number from 1 to 30, $R^1$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

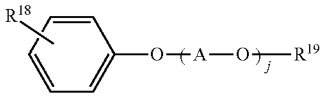

Formula VI

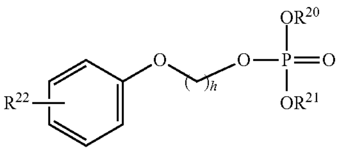

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) is a mixture of at least one selected from Group I and at least one selected from Group II and Group III.

The 41$^{st}$ embodiment is the dispersant composition comprising Component a) that is a condensate polymer obtained from the condensation of formaldehyde with the structure of Formula II-(a):

Formula II-(a)

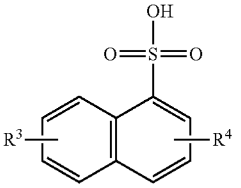

$R^3$ and $R^4$ are independently from each other selected from hydrogen, methyl and ethyl group; and Component b) that is a copolymer of the structure of Formula III and Formula IV-(b):

Formula III

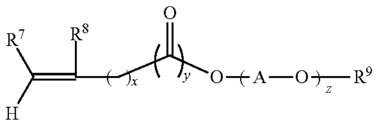

-continued

Formula IV-(b)

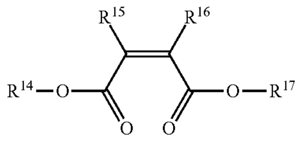

$R^7$, $R^8$, $R^{15}$, $R^{16}$ are independently from each other selected from hydrogen, methyl and ethyl group; $R^9$ is selected from hydrogen and alkyl group having carbon number from 1 to 30, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

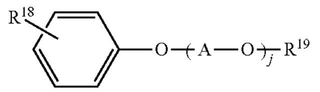

Formula VI

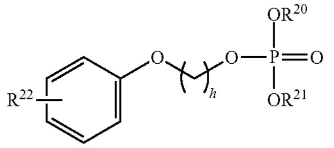

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) is a mixture of at least one selected from Group III and at least one selected from Group I and Group II.

The 42$^{nd}$ embodiment is the dispersant composition comprising Component a) that is a condensate polymer obtained from the condensation of formaldehyde with the structure of Formula II-(a):

Formula II-(a)

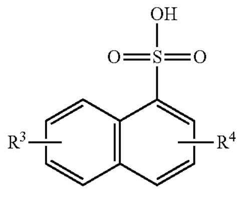

$R^3$ and $R^4$ are independently from each other selected from hydrogen, methyl and ethyl group; and Component b) that is a copolymer of the structure of Formula III and Formula IV-(b):

Formula III

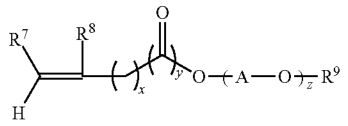

Formula IV-(b)

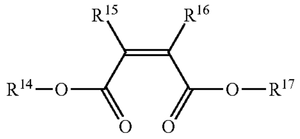

$R^7$, $R^8$, $R^5$, $R^{16}$ are independently from each other selected from hydrogen, methyl and ethyl group; $R^9$ is selected from hydrogen and alkyl group having carbon number from 1 to 30, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

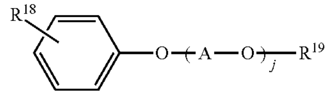

Formula VI

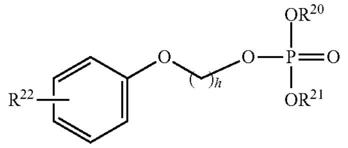

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) is at least one selected from Group II.

The 43$^{rd}$ embodiment is the dispersant composition comprising Component a) that is a condensate polymer obtained from the condensation of formaldehyde with the structure of Formula II-(a):

Formula II-(a)

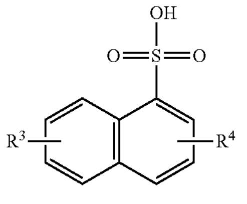

$R^3$ and $R^4$ are independently from each other selected from hydrogen, methyl and ethyl group; and Component b) that is a copolymer of the structure of Formula III and Formula IV-(a) and IV-(b):

Formula III

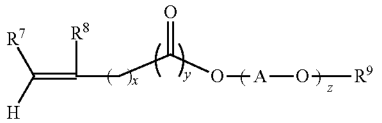

Formula IV-(a)

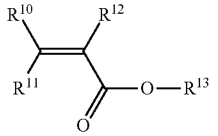

Formula IV-(b)

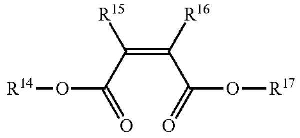

$R^7$, $R^8$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^{13}$, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

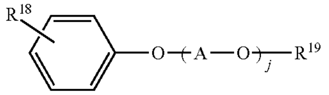

Formula VI

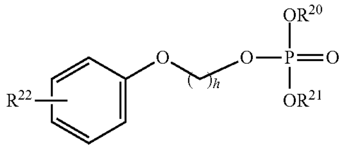

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) is a mixture of at least one selected from Group I and at least one selected from Group II and Group III.

The $44^{th}$ embodiment is the dispersant composition comprising Component a) that is a condensate polymer obtained from the condensation of formaldehyde with the structure of Formula II-(a):

Formula II-(a)

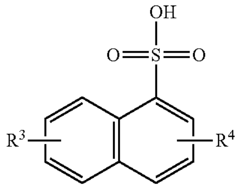

$R^3$ and $R^4$ are independently from each other selected from hydrogen, methyl and ethyl group; and Component b) that is a copolymer of the structure of Formula III and Formula IV-(a) and IV-(b):

Formula III

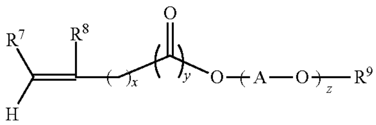

Formula IV-(a)

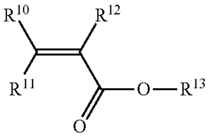

Formula IV-(b)

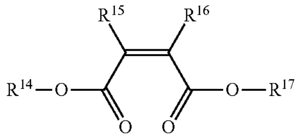

$R^7$, $R^8$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^{13}$, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

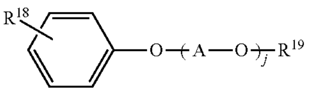

Formula VI

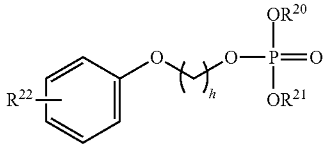

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) is a mixture of at least one selected from Group III and at least one selected from Group I and Group II.

The 4$^{th}$ embodiment is the dispersant composition comprising Component a) that is a condensate polymer obtained from the condensation of formaldehyde with the structure of Formula II-(a):

Formula II-(a)

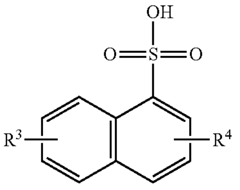

$R^3$ and $R^4$ are independently from each other selected from hydrogen, methyl and ethyl group; and Component b) that is a copolymer of the structure of Formula III and Formula IV-(a) and IV-(b):

Formula III

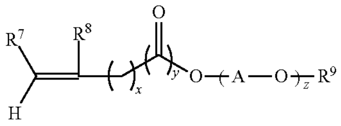

Formula IV-(a)

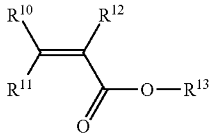

Formula IV-(b)

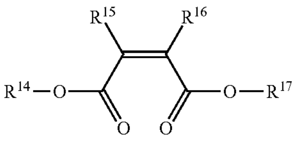

$R^7$, $R^8$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^{13}$, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

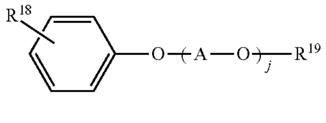

-continued

Formula VI

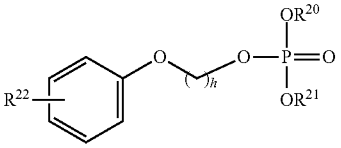

$R^8$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) is at least one selected from Group II.

The 46$^{th}$ embodiment is the dispersant composition comprising Component a) that is a condensate polymer obtained from the condensation of formaldehyde with the structure of Formula II-(b):

Formula II-(b)

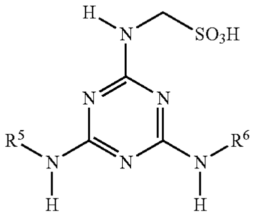

$R^5$, $R^6$ are independently from each other selected from hydrogen, methyl and ethyl group; and Component b) that is a mixture of a copolymer of Formula III and Formula IV-(a):

Formula III

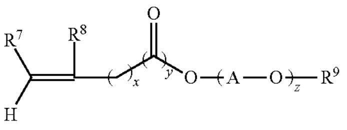

Formula IV-(a)

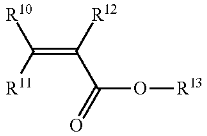

$R^7$, $R^8$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^{13}$ is selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

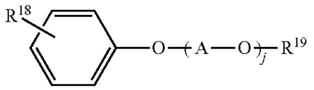

Formula VI

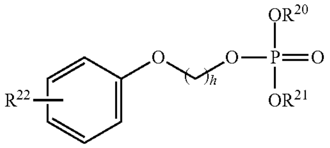

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) that is a mixture of at least one selected from Group I and at least one selected from Group II and Group III.

The 47$^{th}$ embodiment is the dispersant composition comprising Component a) that is a condensate polymer obtained from the condensation of formaldehyde with the structure of Formula II-(b):

Formula II-(b)

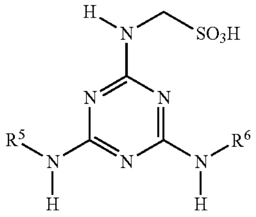

$R^5$, $R^6$ are independently from each other selected from hydrogen, methyl and ethyl group; and Component b) that is a mixture of a copolymer of Formula III and Formula IV-(a):

Formula III

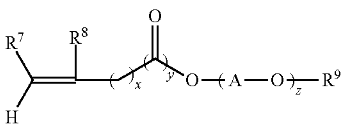

Formula IV-(a)

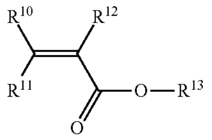

$R^7$, $R^8$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^{13}$ is selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

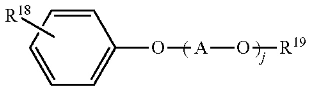

Formula VI

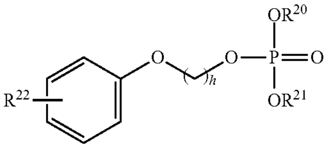

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) that is a mixture of at least one selected from Group III and at least one selected from Group I and Group II.

The 48$^{th}$ embodiment is the dispersant composition comprising Component a) that is a condensate polymer obtained from the condensation of formaldehyde with the structure of Formula II-(b):

Formula II-(b)

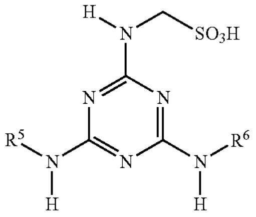

$R^5$, $R^6$ are independently from each other selected from hydrogen, methyl and ethyl group; and Component b) that is a mixture of a copolymer of Formula II and Formula IV-(a):

Formula III

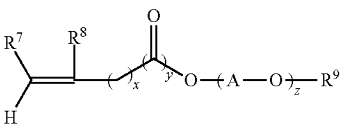

Formula IV-(a)

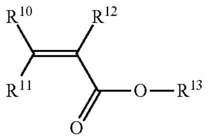

$R^7$, $R^8$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^{13}$ is selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

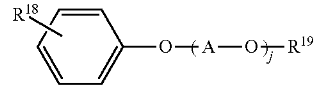

Formula VI

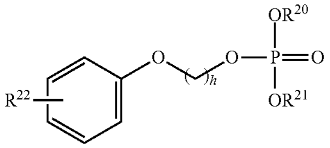

$R^{18}$, $R^{22}$ are independently from each other selected from hydrogen, methyl an ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) that is at least one selected from Group II.

The 49$^{th}$ embodiment is the dispersant composition comprising Component a) that is a condensate polymer obtained from the condensation of formaldehyde with the structure of Formula II-(b):

Formula II-(b)

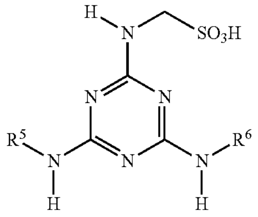

$R^5$, $R^6$ are independently from each other selected from hydrogen, methyl and ethyl group; and Component b) that is a copolymer of the structure of Formula III and Formula IV-(b):

Formula III

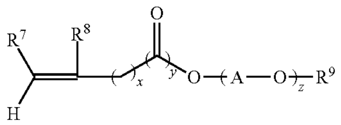

Formula IV-(b)

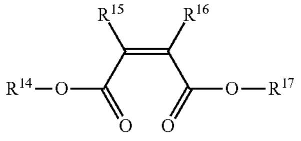

$R^7$, $R^8$, $R^5$, $R^{16}$ are independently from each other selected from hydrogen, methyl and ethyl group; $R^9$ is selected from hydrogen and alkyl group having carbon number from 1 to 30, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

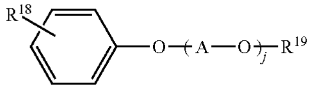

Formula VI

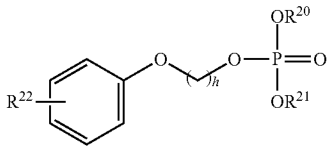

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, is selected from an integer number from 1 to 3, j is selected from an integer number from 1 to 500; and Component c) that is a mixture of at least one selected from Group I and at least one selected from Group II and Group III.

The 50$^{th}$ embodiment is the dispersant composition comprising Component a) that is a condensate polymer obtained from the condensation of formaldehyde with the structure of Formula II-(b):

Formula II-(b)

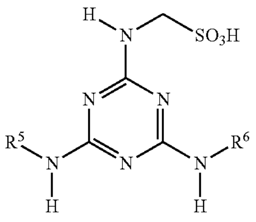

$R^5$, $R^6$ are independently from each other selected from hydrogen, methyl and ethyl group; and Component b) that is a copolymer of the structure of Formula III and Formula IV-(b):

Formula III

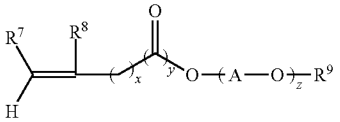

Formula IV-(b)

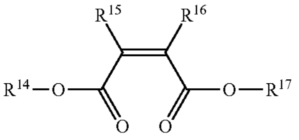

$R^7$, $R^8$, $R^{15}$, $R^{16}$ are independently from each other selected from hydrogen, methyl and ethyl group; $R^9$ is selected from hydrogen and alkyl group having carbon number from 1 to 30, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

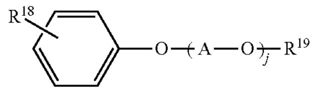

Formula VI

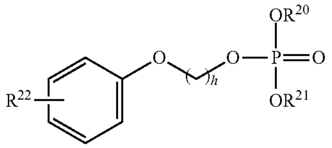

$R^{18}$, $R^{22}$ are independently from each other selected from hydrogen, methy and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) that is a mixture of at least one selected from Group III and at least one selected from Group I and Group II.

The $51^{st}$ embodiment is the dispersant composition comprising Component a) that is a condensate polymer obtained from the condensation of formaldehyde with the structure of Formula II-(b):

Formula II-(b)

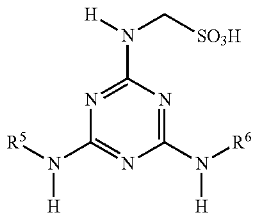

$R^5$, $R^6$ are independently from each other selected from hydrogen, methyl and ethyl group; and Component b) that is a copolymer of the structure of Formula III and Formula IV-(b):

Formula III

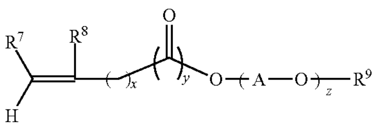

Formula IV-(b)

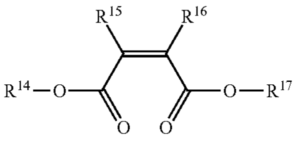

$R^7$, $R^8$, $R^{15}$, $R^{16}$ are independently from each other selected from hydrogen, methyl and ethyl group; $R^9$ is selected from hydrogen and alkyl group having carbon number from 1 to 30, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

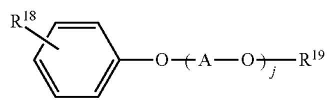

Formula VI

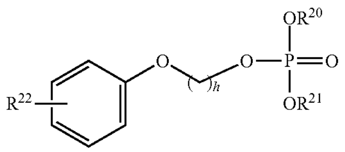

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) that is at least one selected from Group II.

The $52^{nd}$ embodiment is the dispersant composition comprising Component a) that is a condensate polymer obtained from the condensation of formaldehyde with the structure of Formula II-(b):

Formula II-(b)

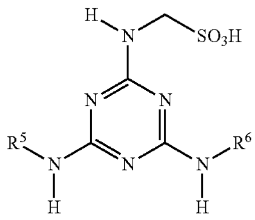

$R^5$, $R^6$ are independently from each other selected from hydrogen, methyl and ethyl group; and Component b) that is a copolymer of the structure of Formula III and Formula IV-(a) and IV-(b):

Formula III

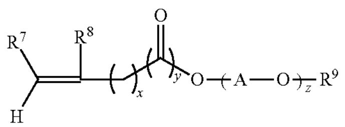

-continued

Formula IV-(a)

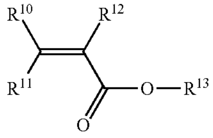

Formula IV-(b)

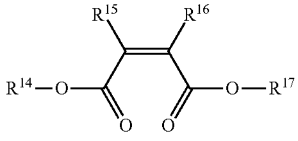

$R^7$, $R^8$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^{13}$, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

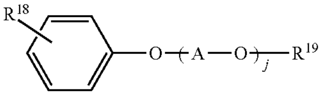

Formula VI

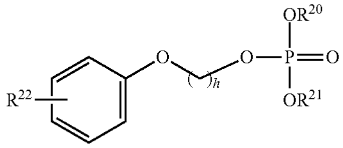

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) that is a mixture of at least one selected from Group I and at least one selected from Group II and Group III.

The 53$^{rd}$ embodiment is the dispersant composition comprising Component a) that is a condensate polymer obtained from the condensation of formaldehyde with the structure of Formula II-(b):

Formula II-(b)

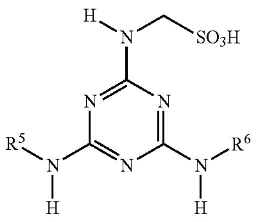

$R^5$, $R^6$ are independently from each other selected from hydrogen, methyl and ethyl group; and Component b) that is a copolymer of the structure of Formula III and Formula IV-(a) and IV-(b):

Formula III

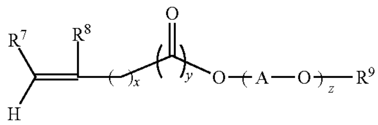

Formula IV-(a)

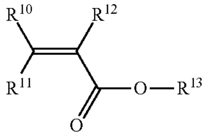

Formula IV-(b)

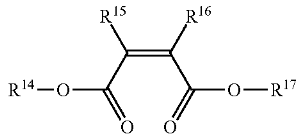

$R^7$, $R^8$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^{13}$, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

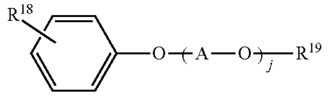

Formula VI

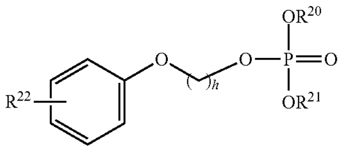

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) that is a mixture of at least one selected from Group III and at least one selected from Group I and Group II.

The 54$^{th}$ embodiment is the dispersant composition comprising Component a) that is a condensate polymer obtained from the condensation of formaldehyde with the structure of Formula II-(b):

Formula II-(b)

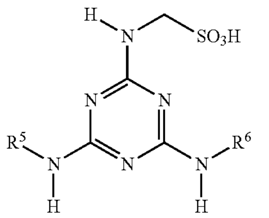

$R^5$, $R^6$ are independently from each other selected from hydrogen, methyl and ethyl group; and Component b) that is a copolymer of the structure of Formula III and Formula IV-(a) and IV-(b):

Formula III

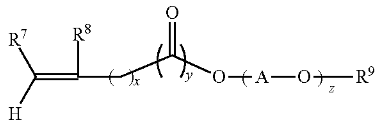

Formula IV-(a)

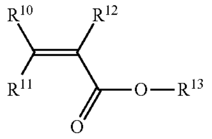

Formula IV-(b)

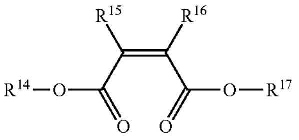

$R^7$, $R^8$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^3$, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

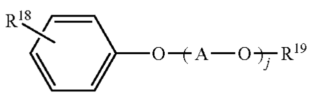

Formula VI

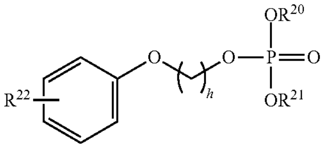

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) that is at least one selected from Group II.

The $55^{th}$ embodiment is the dispersant composition comprising Component a) that is a condensate polymer obtained from the condensation of formaldehyde with the structure of Formula II-(a) and Formula II-(b):

Formula II-(a)

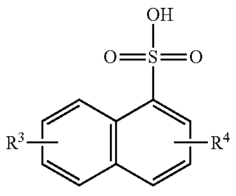

Formula II-(b)

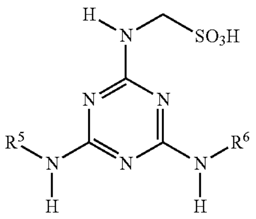

$R^3$, $R^4$, $R^5$, $R^5$ are independently from each other selected from hydrogen, methyl and ethyl group; and Component b) that is a mixture of a copolymer of Formula III and Formula IV-(a):

Formula III

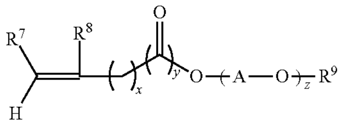

Formula IV-(a)

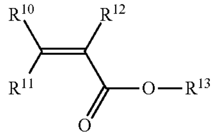

$R^7$, $R^8$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^{13}$ is selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

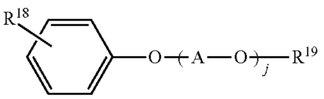

-continued

Formula VI

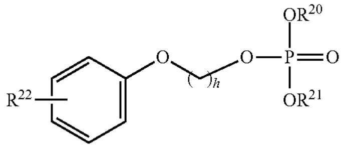

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) that is a mixture of at least one selected from Group I and at least one selected from Group II and Group III.

The 56$^{th}$ embodiment is the dispersant composition comprising Component a) that is a condensate polymer obtained from the condensation of formaldehyde with the structure of Formula II-(a) and Formula II-(b):

Formula II-(a)

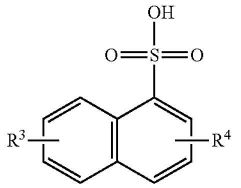

Formula II-(b)

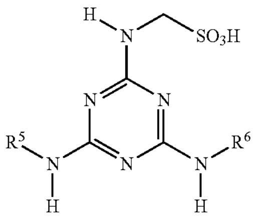

$R^3$, $R^4$, $R^5$, $R^6$ are independently from each other selected from hydrogen, methyl and ethyl group; and Component b) that is a mixture of a copolymer of Formula III and Formula IV-(a):

Formula III

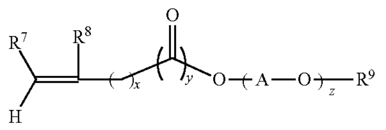

Formula IV-(a)

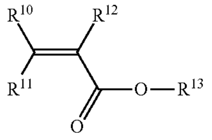

$R^7$, $R^8$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^{13}$ is selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

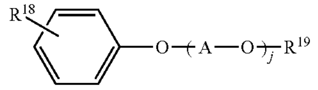

Formula VI

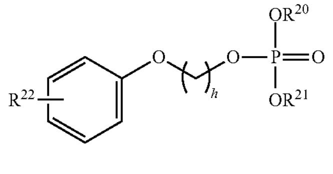

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) that is a mixture of at least one selected from Group III and at least one selected from Group I and Group II.

The 57$^{th}$ embodiment is the dispersant composition comprising Component a) that is a condensate polymer obtained from the condensation of formaldehyde with the structure of Formula II-(a) and Formula II-(b):

Formula II-(a)

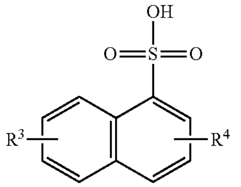

Formula II-(b)

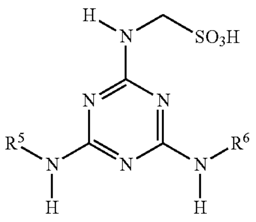

$R^3$, $R^4$, $R^5$, $R^6$ are independently from each other selected from hydrogen, methyl and ethyl group; and Component b) that is a mixture of a copolymer of Formula III and Formula IV-(a):

Formula III

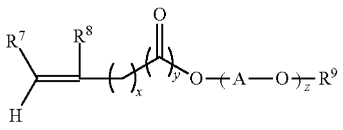

-continued

Formula IV-(a)

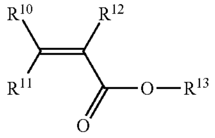

$R^7$, $R^8$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^3$ is selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

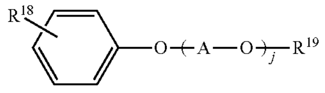

Formula VI

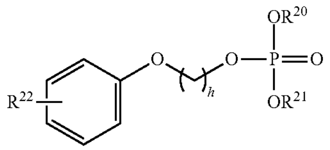

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) that is at least one selected from Group II.

The 58$^{th}$ embodiment is the dispersant composition comprising Component a) that is a condensate polymer obtained from the condensation of formaldehyde with the structure of Formula II-(a) and Formula II-(b):

Formula II-(a)

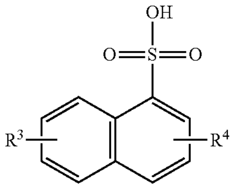

Formula II-(b)

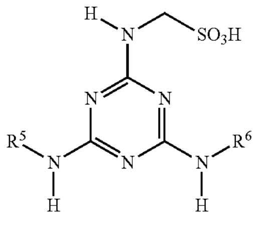

$R^3$, $R^4$, $R^5$, $R^6$ are independently from each other selected from hydrogen, methyl and ethyl group; and Component b) that is a copolymer of the structure of Formula III and Formula IV-(b):

Formula III

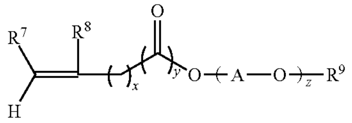

Formula IV-(b)

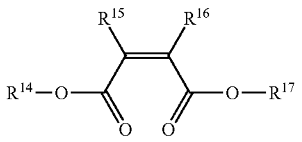

$R^7$, $R^8$, $R^{15}$, $R^{16}$ are independently from each other selected from hydrogen, methyl and ethyl group; $R^9$ is selected from hydrogen and alkyl group having carbon number from 1 to 30, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

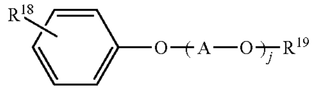

Formula VI

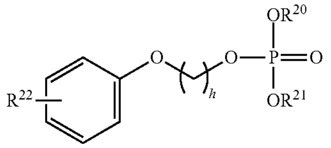

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; that is a mixture of at least one selected from Group I and at least one selected from Group II and Group III.

The 59th embodiment is the dispersant composition comprising Component a) that is a condensate polymer obtained from the condensation of formaldehyde with the structure of Formula II-(a) and Formula II-(b):

Formula II-(a)

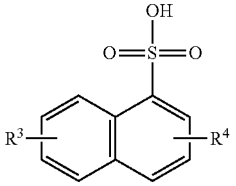

Formula II-(b)

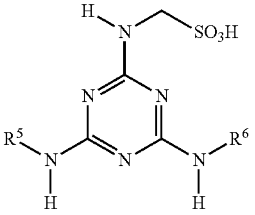

$R^3$, $R^4$, $R^5$, $R^6$ are independently from each other selected from hydrogen, methyl and ethyl group; and Component b) that is a copolymer of the structure of Formula III and Formula IV-(b):

Formula III

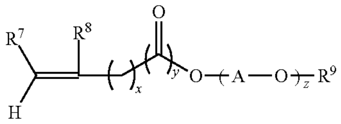

Formula IV-(b)

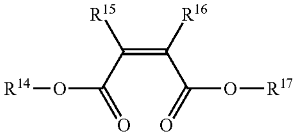

$R^7$, $R^8$, $R^{15}$, $R^{16}$ are independently from each other selected from hydrogen, methyl and ethyl group; $R^9$ is selected from hydrogen and alkyl group having carbon number from 1 to 30, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

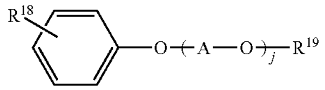

Formula VI

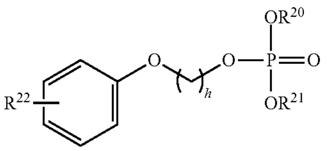

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) is a mixture that is a mixture of at least one selected from Group III and at least one selected from Group I and Group II.

The 60$^{th}$ embodiment is the dispersant composition comprising Component a) that is a condensate polymer obtained from the condensation of formaldehyde with the structure of Formula II-(a) and Formula II-(b):

Formula II-(a)

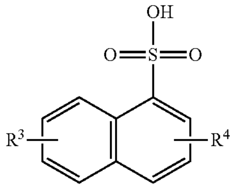

Formula II-(b)

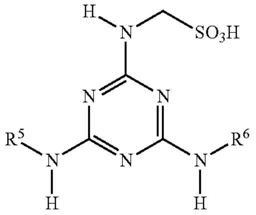

$R^3$, $R^4$, $R^5$, $R^6$ are independently from each other selected from hydrogen, methyl and ethyl group; and Component b) that is a copolymer of the structure of Formula III and Formula IV-(b):

Formula III

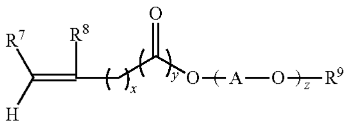

Formula IV-(b)

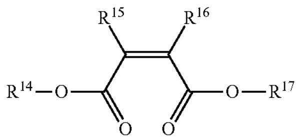

$R^7$, $R^8$, $R^{15}$, $R^{16}$ are independently from each other selected from hydrogen, methyl and ethyl group; $R^9$ is selected from hydrogen and alkyl group having carbon number from 1 to 30, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

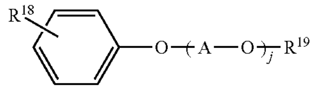

Formula VI

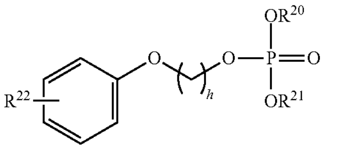

$R^8$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) is at least one selected from Group II.

The $61^{st}$ embodiment is the dispersant composition comprising Component a) that is a condensate polymer obtained from the condensation of formaldehyde with the structure of Formula II-(a) and Formula II-(b):

Formula II-(a)

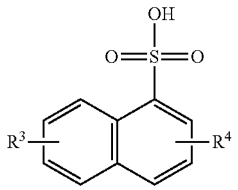

Formula II-(b)

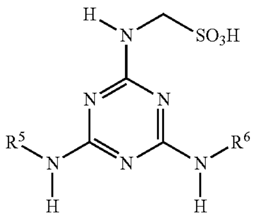

$R^3$, $R^4$, $R^5$, $R^6$ are independently from each other selected from hydrogen, methyl and ethyl group; and Component b) that is a copolymer of the structure of Formula III and Formula IV-(a) and IV-(b):

Formula III

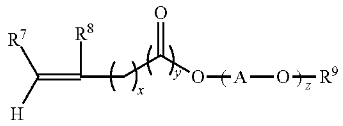

Formula IV-(a)

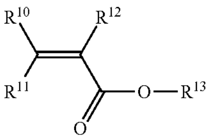

-continued

Formula IV-(b)

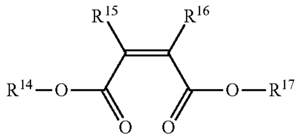

$R^7$, $R^8$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^3$, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

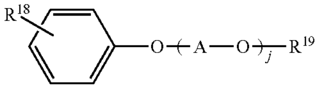

Formula VI

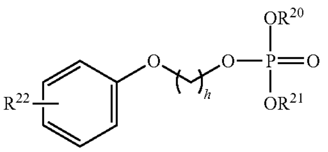

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) is a mixture that is a mixture of at least one selected from Group I and at least one selected from Group II and Group III.

The $62^{nd}$ embodiment is the dispersant composition comprising Component a) that is a condensate polymer obtained from the condensation of formaldehyde with the structure of Formula II-(a) and Formula II-(b):

Formula II-(a)

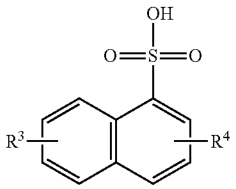

-continued

Formula II-(b)

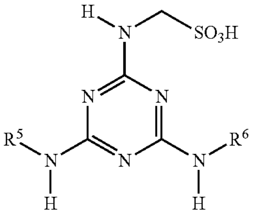

$R^3$, $R^4$, $R^5$, $R^5$ are independently from each other selected from hydrogen, methyl and ethyl group; and Component b) that is a copolymer of the structure of Formula III and Formula IV-(a) and IV-(b):

Formula III

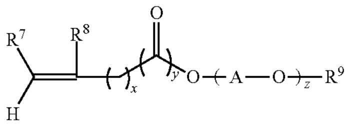

Formula IV-(a)

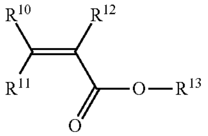

Formula IV-(b)

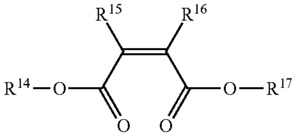

$R^7$, $R^8$, $R^{10}$, $R^{11}$, $R^{12}$, $R^5$, $R^{16}$ are independently from each other selected from hydrogen, methyl and ethyl group; $R^9$ is selected from hydrogen and alkyl group having carbon number from 1 to 30, $R^3$, $R^{13}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

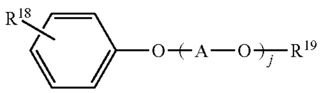

Formula VI

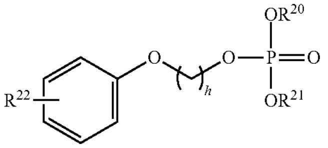

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) is a mixture that is a mixture of at least one selected from Group III and at least one selected from Group I and Group II.

The $63^{rd}$ embodiment is the dispersant composition comprising Component a) that is a condensate polymer obtained from the condensation of formaldehyde with the structure of Formula II-(a) and Formula II-(b):

Formula II-(a)

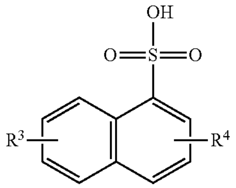

Formula II-(b)

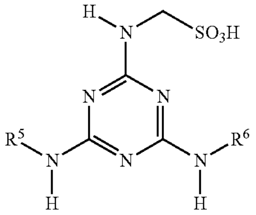

$R^3$, $R^4$, $R^5$, $R^6$ are independently from each other selected from hydrogen, methyl and ethyl group; and Component b) that is a copolymer of the structure of Formula III and Formula IV-(a) and IV-(b):

Formula III

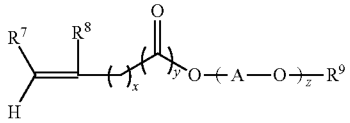

Formula IV-(a)

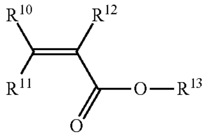

Formula IV-(b)

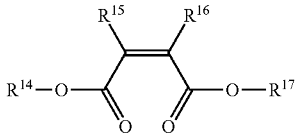

$R^7$, $R^6$, $R^{10}$, $R^{11}$, $R^{12}$, $R^{15}$, $R^{16}$ are independently from each other selected from hydrogen, methyl and ethyl group; $R^9$ is selected from hydrogen and alkyl group having carbon number from 1 to 30, $R^{13}$, $R^{14}$ and $R^{17}$ are independently from each other selected from hydrogen, methyl, ethyl, hydroxy propyl, alkaline metal, alkaline earth metal, ammonium and amine, A is alkylene group having carbon number from 2 to 18, x is an integer number from 0 to 2; y is an integer number from 0 to 1, z is selected from an integer number from 1 to 500 and a condensate polymer obtained from the condensation of formaldehyde with the structure of Formula V and Formula VI:

Formula V

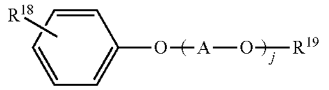

Formula VI

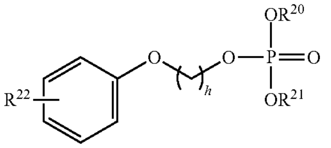

$R^{18}$, $R^{22}$ are independently from each other selected from hydrogen, methyl and ethyl group, $R^{19}$ is selected from hydrogen and alkyl group having carbon number from 1 to 30, $R^{20}$, $R^{21}$ are independently from each other selected from hydrogen, alkyl group having carbon number from 1 to 4, A is alkylene group having carbon number from 2 to 18, h is selected from an integer number from 1 to 3, j is selected from an integer number from 1 to 500; and Component c) is at least one selected from Group II.

Example

Below examples are used to further illustrate the invention without limitation on the claimed protective scope.

The dispersant composition comprising Component a), b) and c) is mixed with water and the resultant mixture is added into concrete to test its performances of initial slump, flowability and compressive strength.

As an example, the samples of the dispersant aqueous solution are prepared as follows: 500 g of the aqueous solution of Component a) with the solid content of 40% by weight, 200 g of the aqueous solution of Component b) with the solid content of 50% by weight and 10 g of Component c) are mixed and further add water to obtain a mixture of 1000 g in total.

As an example, 400 g of cement, 813 g of sand, 961 g of stone and 180 g of water are mixed to obtain 1 $m^3$ of concrete.

The mixture of water and the dispersant composition is added into the concrete by stirring and the resultant concrete is ready for initial slump and flowability test according to EN 12350-2 and air content test according to EN 12350-7. Specimens of the resultant concrete are cured according to EN 12390-2 and the resultant cured specimens are ready for compressive strength test according to EN 12390-3.

Table 1 list samples and comparative samples of preparing the mixture of water of the dispersant composition.

Table 2 list the test results of concrete flowability, concrete initial slump, air content of concrete as well as the compressive strength of the cured concrete with addition of samples list in Table 1. Examples 0, 1, 2, C1, C2 correspond to performance tests of mortar and concrete with addition of Samples 0, 1, 2 and comparative samples 1 and 2.

TABLE 1

| Sample of Dispersant Composition | Component a) | Component b) | Component c) | Water |
|---|---|---|---|---|
| Sample 0 | 100 g Sodium salt of beta-naphthalene sulfonic acid formaldehyde condensate | 50 g Polycarboxylate Ether | / | 350 g |
| Sample 1 | 100 g Sodium salt of beta-naphthalene sulfonic acid formaldehyde condensate | 50 g Polycarboxylate Ether | A mixture of Component c)-1:<br>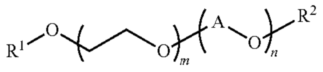<br>$R^1$ is a mixture of C9, C10 and C11 alkyl group, $R^2$ is hydrogen, m = 8, n = 1, A is C4 alkylene group; and Component c)-2:<br>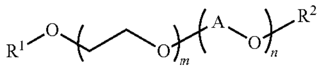<br>$R^1$ is a mixture of C9, C10 and C11 alkyl group, $R^2$ is hydrogen, m = 8, n = 2, A is C4 alkylene group<br>The molar ratio of Component c)-1 and Component c)-2 is 1:1 | 350 g |
| Comparative Sample 1 | 100 g Sodium salt of beta-naphthalene sulfonic acid formaldehyde condensate | 50 g Polycarboxylate Ether | 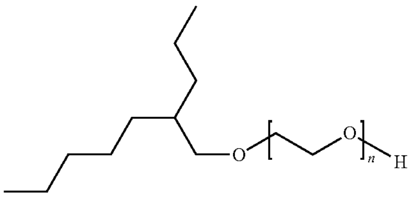<br>n = 10 | 350 g |

TABLE 1-continued

| Sample of Dispersant Composition | Component a) | Component b) | Component c) | Water |
|---|---|---|---|---|
| Sample 2 | 100 g Sodium salt of beta-naphthalene sulfonic acid formaldehyde condensate | 50 g Polycarboxylate Ether | 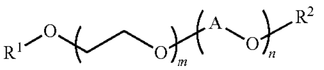 $R^1$ is 2-propylheptyl group; $R^2$ is hydrogen; m = 6; n = 5; A is C3 alkylene group; | 350 g |
| Comparative Sample 2 | 100 g Sodium salt of beta-naphthalene sulfonic acid formaldehyde condensate | 50 g Polycarboxylate Ether | 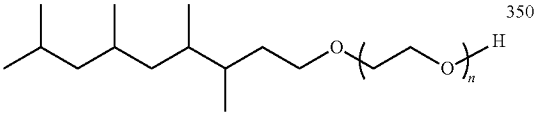 n = 11 | 350 g |

TABLE 2

| | Flowability | Intitial Slump | Air content | Compressive Strength (MPa) | | |
|---|---|---|---|---|---|---|
| Example | (cm) | (cm) | (%) | 3 days | 7 days | 28 days |
| 0 | 41 | 20.0 | 2.7 | 36.9 | 43.3 | 47.6 |
| 1 | 46 | 22.0 | 2.1 | 39.6 | 45.2 | 53.5 |
| C1 | 47 | 22.5 | 4.5 | 27.8 | 34.4 | 37.1 |
| 2 | 47 | 23 | 2.1 | 39.1 | 44.1 | 53.3 |
| C2 | 57 | 24.5 | 4.5 | 32.5 | 36.7 | 40.7 |

The invention claimed is:

1. A dispersant composition comprising a) at least one polymer constituted of monomers having naphthalene ring and/or melamine;

b) at least one polymer having carboxylic acid and/or phosphoric acid groups and/or any group that is hydrolyzed into a carboxylic or phosphoric acid group; and c) at least one polymer having a structure of Formula I:

Formula I

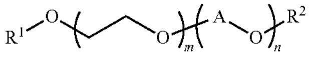

wherein $R^1$ is hydrogen or alkyl group having carbon number not less than 1, cycloalkyl or cycloalkenyl group having carbon number not less than 3, alkenyl group having carbon number not less than 2, aryl group having carbon number not less than 6; $R^2$ is hydrogen or alkyl group having carbon number from 1 to 3; A is alkylene group having carbon number from 3 or 4; m and n are integer numbers wherein m is more than n and the sum of m and n is more than 9 and less than 12.

2. The dispersant composition according to claim 1, wherein said Component a) is a condensate polymer obtained from the condensation of formaldehyde with the structure of Formula II-(a) and/or Formula II-(b):

Formula II-(a)

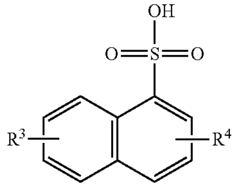

-continued

Formula II-(b)

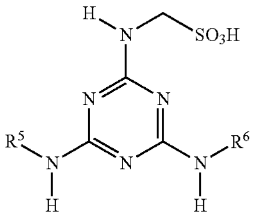

wherein, $R^3$, $R^4$ are independently from each other selected from hydrogen, methyl, ethyl, propyl, butyl and hydroxy group; $R^5$, $R^6$ are independently from each other selected from hydrogen, methyl and ethyl group.

3. The dispersant composition according to claim 1, wherein said Component a) is a condensate polymer obtained from the condensation of formaldehyde with the structure of Formula II-(a):

Formula II-(a)

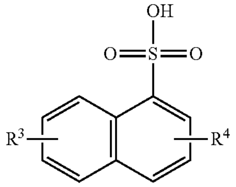

wherein, $R^3$, $R^4$ are independently from each other selected from hydrogen, methyl, ethyl, propyl, butyl and hydroxyl group.

4. The dispersant composition according to claim 1, wherein said Component b) is a copolymer of the structure of Formula III and one or more selected from the structure of Formula IV-(a) and Formula IV-(b), and/or a condensate polymer obtained from the condensation of formaldehyde with the structure of Formula V and Formula VI:

Formula (III)

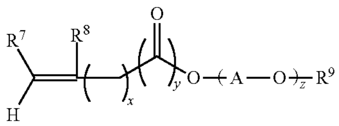

-continued

Formula IV-(a)

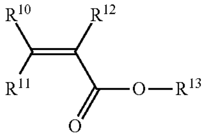

Formula IV-(b)

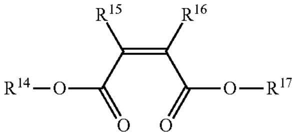

Formula V

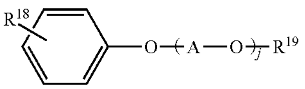

Formula VI

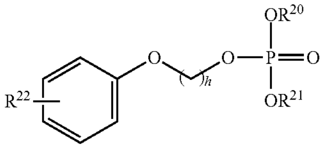

wherein, $R^7$, $R^8$, $R^{10}$, $R^{11}$, $R^{12}$, $R^{15}$, $R^{16}$, $R^{18}$, $R^{22}$ are independently from each other selected from hydrogen, methyl and ethyl group; $R^9$, $R^{19}$ are independently from each other selected from hydrogen and alkyl group having carbon number from 1 to 30; $R^{13}$, $R^{14}$ and $R^{17}$ are independently from each other selected from hydrogen, methyl, ethyl, hydroxy propyl, alkaline metal, alkaline earth metal, ammonium and amine; $R^{29}$ and $R^{21}$ are independently from each other selected from hydrogen, alkyl group having carbon number from 1 to 4; A is alkylene group having carbon number from 2 to 18; x is an integer number from 0 to 2; y is an integer number from 0 to 1; h is selected from an integer number from 1 to 3; z and j are independently from each other selected from an integer number from 1 to 500.

5. The dispersant composition according to claim 1, wherein said Component b) is a copolymer of the structure of Formula III and one or more selected from the structure of Formula IV-(a) and Formula IV-(b), and/or a condensate polymer obtained from the condensation of formaldehyde with the structure of Formula V and Formula VI:

Formula (III)

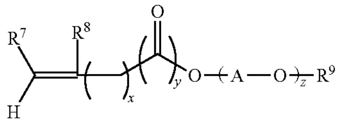

Formula IV-(a)

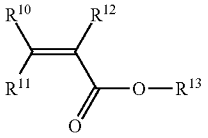

Formula IV-(b)

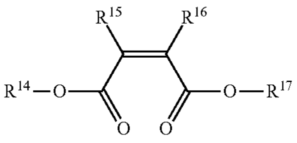

-continued

Formula V

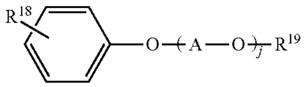

Formula VI

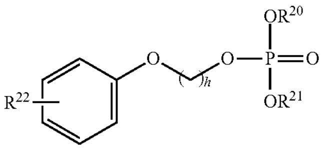

wherein, $R^7$, $R^8$, $R^{10}$, $R^{11}$, $R^{12}$, $R^{15}$, $R^{16}$, $R^{18}$, $R^{22}$ are independently from each other selected from hydrogen and methyl group; $R^9$, $R^{19}$ are independently from each other selected from hydrogen and alkyl group having carbon number from 1 to 30; $R^{13}$, $R^{14}$ and $R^{17}$ are independently from each other selected from hydrogen, methyl, ethyl, hydroxy propyl, alkaline metal, alkaline earth metal, ammonium and amine; $R^{29}$ and $R^{21}$ are independently from each other selected from hydrogen, alkyl group having carbon number from 1 to 4; A is alkylene group having carbon number from 2 to 4; x is an integer number from 0 to 2; y is an integer number from 0 to 1; h is selected from an integer number from 1 to 3; z and j are independently from each other selected from an integer number from 1 to 250.

6. The dispersant composition according to claim 1, wherein said Component c) is the structure of Formula I:

Formula I

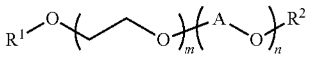

wherein $R^1$ is hydrogen or alky group having carbon number not less than 1 and no more than 34, cycloalkyl or cycloalkenyl group having carbon number not less than 3 and no more than 8, alkenyl group having carbon number not less than 2 and no more than 18, aryl group having carbon number not less than 6; $R^2$ is hydrogen or alky group having carbon number from 1 to 3; A is alkylene group having carbon number from 3 or 4; m is an integer number selected from 5 to 11 and n is an integer number selected from 1 to 7, wherein m is more than n and the sum of m and n is more than 9 and less than 12.

7. The dispersant composition according to claim 1, wherein the ratio by weight of said Component a) to Component b) is from 1:10 to 10:1.

8. The dispersant composition according to claim 1, wherein the ratio by weight of said Component c) to the sum of Component a) and b) is from 1:100 to 1:5.

9. The dispersant composition according to claim 1, wherein the dispersant composition is an aqueous composition.

10. A mortar or concrete comprising cement and the dispersant composition of claim 1 as a dispersant, wherein the weight percentage of said dispersant composition is from 0.01% to 2.5% based on the weight of cement in the mortar or concrete.

11. The mortar or concrete of claim 10, wherein said dispersant composition is dissolved in water before added into the mortar or concrete, wherein the ratio by weight of said dispersant composition and water is from 1:10 to 1:1.

12. The dispersant composition according to claim 2, wherein said Component b) is a copolymer of the structure of Formula III and one or more selected from the structure of Formula IV-(a) and Formula IV-(b), and/or a condensate polymer obtained from the condensation of formaldehyde with the structure of Formula V and Formula VI:

Formula (III)

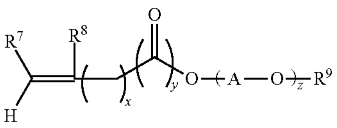

Formula IV-(a)

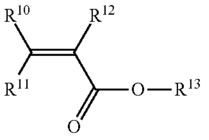

Formula IV-(b)

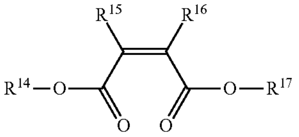

Formula V

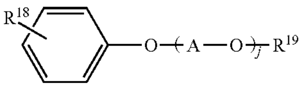

Formula VI

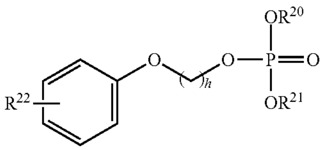

wherein, $R^7$, $R^8$, $R^{10}$, $R^{11}$, $R^{12}$, $R^{15}$, $R^{16}$, $R^{18}$, $R^{22}$ are independently from each other selected from hydrogen, methyl and ethyl group; $R^9$, $R^{19}$ are independently from each other selected from hydrogen and alkyl group having carbon number from 1 to 30; $R^{13}$, $R^{14}$ and $R^{17}$ are independently from each other selected from hydrogen, methyl, ethyl, hydroxy propyl, alkaline metal, alkaline earth metal, ammonium and amine; $R^{29}$ and $R^{21}$ are independently from each other selected from hydrogen, alkyl group having carbon number from 1 to 4; A is alkylene group having carbon number from 2 to 18; x is an integer number from 0 to 2; y is an integer number from 0 to 1; h is selected from an integer number from 1 to 3; z and j are independently from each other selected from an integer number from 1 to 500.

13. The dispersant composition according to claim 3, wherein said Component b) is a copolymer of the structure of Formula III and one or more selected from the structure of Formula IV-(a) and Formula IV-(b), and/or a condensate polymer obtained from the condensation of formaldehyde with the structure of Formula V and Formula VI:

Formula (III)

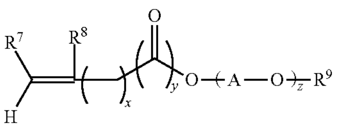

-continued

Formula IV-(a)

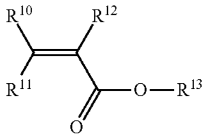

Formula IV-(b)

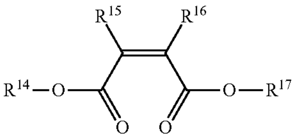

Formula V

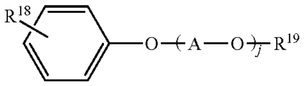

Formula VI

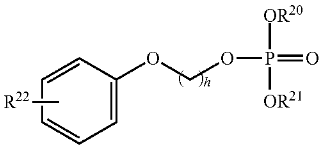

wherein, $R^7$, $R^8$, $R^{10}$, $R^{11}$, $R^{12}$, $R^{15}$, $R^{16}$, $R^{18}$, $R^{22}$ are independently from each other selected from hydrogen, methyl and ethyl group; $R^9$, $R^{19}$ are independently from each other selected from hydrogen and alkyl group having carbon number from 1 to 30; $R^{13}$, $R^{14}$ and $R^{17}$ are independently from each other selected from hydrogen, methyl, ethyl, hydroxy propyl, alkaline metal, alkaline earth metal, ammonium and amine; $R^{20}$ and $R^{21}$ are independently from each other selected from hydrogen, alkyl group having carbon number from 1 to 4; A is alkylene group having carbon number from 2 to 18; x is an integer number from 0 to 2; y is an integer number from 0 to 1; h is selected from an integer number from 1 to 3; z and j are independently from each other selected from an integer number from 1 to 500.

14. The dispersant composition according to claim 2, wherein said Component b) is a copolymer of the structure of Formula III and one or more selected from the structure of Formula IV-(a) and Formula IV-(b), and/or a condensate polymer obtained from the condensation of formaldehyde with the structure of Formula V and Formula VI:

Formula III

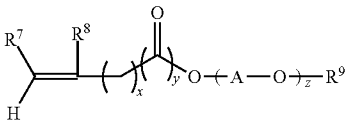

Formula IV-(a)

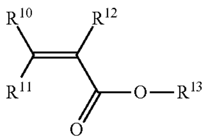

Formula IV-(b)

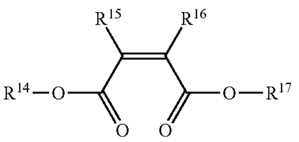

-continued

Formula V

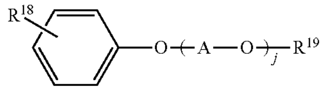

Formula VI

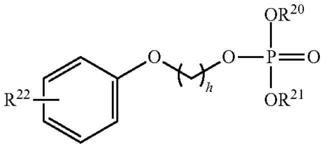

wherein, $R^7$, $R^8$, $R^{10}$, $R^{11}$, $R^{12}$, $R^{15}$, $R^{16}$, $R^{18}$, $R^{22}$ are independently from each other selected from hydrogen and methyl group; $R^9$, $R^{19}$ are independently from each other selected from hydrogen and alkyl group having carbon number from 1 to 30; $R^{13}$, $R^{14}$ and $R^{17}$ are independently from each other selected from hydrogen, methyl, ethyl, hydroxy propyl, alkaline metal, alkaline earth metal, ammonium and amine; $R^{20}$ and $R^{21}$ are independently from each other selected from hydrogen, alkyl group having carbon number from 1 to 4; A is alkylene group having carbon number from 2 to 4; x is an integer number from 0 to 2; y is an integer number from 0 to 1; h is selected from an integer number from 1 to 3; z and j are independently from each other selected from an integer number from 1 to 250.

15. The dispersant composition according to claim 3, wherein said Component b) is a copolymer of the structure of Formula III and one or more selected from the structure of Formula IV-(a) and Formula IV-(b), and/or a condensate polymer obtained from the condensation of formaldehyde with the structure of Formula V and Formula VI:

Formula (III)

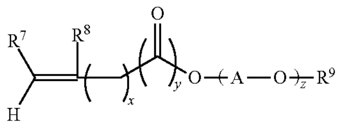

Formula IV-(a)

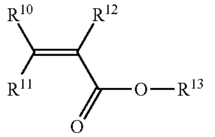

Formula IV-(b)

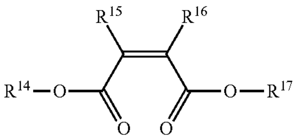

Formula V

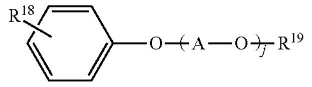

Formula VI

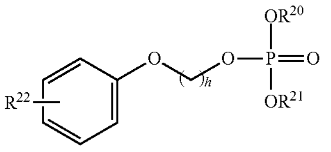

wherein, $R^7$, $R^8$, $R^{10}$, $R^{11}$, $R^{12}$, $R^{15}$, $R^{16}$, $R^{18}$, $R^{22}$ are independently from each other selected from hydrogen and methyl group; $R^9$, $R^{19}$ are independently from each other selected from hydrogen and alkyl group having carbon number from 1 to 30; $R^{13}$, $R^{14}$ and $R^{17}$ are independently from each other selected from hydrogen, methyl, ethyl, hydroxy propyl, alkaline metal, alkaline earth metal, ammonium and amine; $R^{20}$ and $R^{21}$ are independently from each other selected from hydrogen, alkyl group having carbon number from 1 to 4; A is alkylene group having carbon number from 2 to 4; x is an integer number from 0 to 2; y is an integer number from 0 to 1; h is selected from an integer number from 1 to 3; z and j are independently from each other selected from an integer number from 1 to 250.

16. The dispersant composition according to claim 2, wherein said Component c) is the structure of Formula I:

Formula I

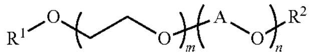

wherein $R^1$ is hydrogen or alky group having carbon number not less than 1 and no more than 34, cycloalkyl or cycloalkenyl group having carbon number not less than 3 and no more than 8, alkenyl group having carbon number not less than 2 and no more than 18, aryl group having carbon number not less than 6; $R^2$ is hydrogen or alky group having carbon number from 1 to 3; A is alkylene group having carbon number from 3 or 4; m is an integer number selected from 5 to 11 and n is an integer number selected from 1 to 7, wherein m is more than n and the sum of m and n is more than 9 and less than 12.

17. The dispersant composition according to claim 3, wherein said Component c) is the structure of Formula I:

Formula I

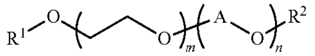

wherein $R^1$ is hydrogen or alky group having carbon number not less than 1 and no more than 34, cycloalkyl or cycloalkenyl group having carbon number not less than 3 and no more than 8, alkenyl group having carbon number not less than 2 and no more than 18, aryl group having carbon number not less than 6; $R^2$ is hydrogen or alky group having carbon number from 1 to 3; A is alkylene group having carbon number from 3 or 4; m is an integer number selected from 5 to 11 and n is an integer number selected from 1 to 7, wherein m is more than n and the sum of m and n is more than 9 and less than 12.

18. The dispersant composition according to claim 4, wherein said Component c) is the structure of Formula I:

Formula I

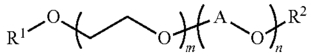

wherein $R^1$ is hydrogen or alky group having carbon number not less than 1 and no more than 34, cycloalkyl or cycloalkenyl group having carbon number not less than 3 and no more than 8, alkenyl group having carbon number not less than 2 and no more than 18, aryl group having carbon number not less than 6; $R^2$ is hydrogen or alky group having carbon number from 1 to 3; A is alkylene group having carbon number from 3 or 4; m is an integer number selected from 5 to 11 and n is an integer number selected from 1 to 7, wherein m is more than n and the sum of m and n is more than 9 and less than 12.

19. The dispersant composition according to claim 5, wherein said Component c) is the structure of Formula I:

Formula I

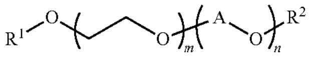

wherein $R^1$ is hydrogen or alky group having carbon number not less than 1 and no more than 34, cycloalkyl or cycloalkenyl group having carbon number not less than 3 and no more than 8, alkenyl group having carbon number not less than 2 and no more than 18, aryl group having carbon number not less than 6; $R^2$ is hydrogen or alky group having carbon number from 1 to 3; A is alkylene group having carbon number from 3 or 4; m is an integer number selected from 5 to 11 and n is an integer number selected from 1 to 7, wherein m is more than n and the sum of m and n is more than 9 and less than 12.

20. The dispersant composition according to claim 7, wherein the ratio by weight of said Component a) to Component b) is from 1:3 to 3:1.

21. The dispersant composition according to claim 20, wherein the ratio by weight of said Component a) to Component b) is from 1:2 to 2:1.

22. The dispersant composition according to claim 8, wherein the ratio by weight of said Component c) to the sum of Component a) and b) is from 1:50 to 1:6.

23. The mortar or concrete of claim 11, wherein said dispersant composition is dissolved in water before added into the mortar or concrete, wherein the ratio by weight of said dispersant composition and water is from 1:6 to 1:1.5.

* * * * *